(12) United States Patent
Tsukada et al.

(10) Patent No.: US 8,442,729 B2
(45) Date of Patent: May 14, 2013

(54) TRAVELING SYSTEM FOR ENGINEERING MACHINE

(75) Inventors: Hidenobu Tsukada, Ushiku (JP);
Kazunori Nakamura, Tsuchiura (JP);
Tsuyoshi Nakamura, Tsuchiura (JP);
Yasuo Yamazaki, Ryuugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 787 days.

(21) Appl. No.: 12/598,653

(22) PCT Filed: Jul. 14, 2008

(86) PCT No.: PCT/JP2008/062722
§ 371 (c)(1),
(2), (4) Date: Nov. 3, 2009

(87) PCT Pub. No.: WO2009/022514
PCT Pub. Date: Feb. 19, 2009

(65) Prior Publication Data
US 2010/0138118 A1 Jun. 3, 2010

(30) Foreign Application Priority Data
Aug. 10, 2007 (JP) ................................. 2007-209991

(51) Int. Cl.
*G06F 19/00* (2006.01)
(52) U.S. Cl.
USPC ........................................................... 701/50
(58) Field of Classification Search .............. 701/50–51, 701/62, 64, 67; 477/125; 74/335
See application file for complete search history.

(56) References Cited

U.S. PATENT DOCUMENTS

| | | | | | |
|---|---|---|---|---|---|
| 4,208,925 | A | * | 6/1980 | Miller et al. | 477/63 |
| 4,943,921 | A | * | 7/1990 | Baltusis et al. | 701/55 |
| 4,953,091 | A | * | 8/1990 | Baltusis et al. | 701/67 |
| 5,016,175 | A | * | 5/1991 | Baltusis et al. | 701/58 |
| 5,166,879 | A | * | 11/1992 | Greene et al. | 701/62 |
| 5,848,664 | A | | 12/1998 | Kaspar | |

FOREIGN PATENT DOCUMENTS

| | | |
|---|---|---|
| DE | 40 31 735 A1 | 7/1991 |
| EP | 0 240 900 A2 | 10/1987 |
| FR | 2 656 840 A1 | 7/1991 |
| JP | 6-144078 A | 5/1994 |
| JP | 11-166623 A | 6/1999 |
| JP | 11-230333 A | 8/1999 |

* cited by examiner

*Primary Examiner* — Yonel Beaulieu
(74) *Attorney, Agent, or Firm* — Mattingly & Malur, PC

(57) ABSTRACT

This invention provides a traveling system for an engineering machine, adapted to limit a maximum traveling speed of the machine without causing decreases in engineering work efficiency or in accelerating performance during a start of traveling, and to improve fuel efficiency by suppressing a loss of engine output horsepower under the limited state of the maximum traveling speed. During fourth-gear shift control process, capacities of first and second hydraulic motors 23, 24 are controlled in coordinative form and the second hydraulic motor 24 has its minimum tilting amount limited to a tilting amount limit q2cmin. In addition, when a tilting amount of the first hydraulic motor 23 reaches a minimum tilting amount q1min, the engine 10 has its maximum engine speed limited to a first engine speed limit Ncmax1 (e.g., 1,800 rpm).

7 Claims, 20 Drawing Sheets

TRAVELING SYSTEM FOR ENGINEERING MACHINE

TECHNICAL FIELD

The present invention relates generally to traveling systems for wheel loaders and other engineering machines, and more particularly, to a traveling system for an engineering machine suitable for use under a limited state of a maximum traveling speed.

BACKGROUND ART

The traveling systems for engineering machines such as wheel loaders include one described in Patent Document 1. The traveling system disclosed therein comprises a diesel engine and a travel device having a Hydro-Static Power Transmission (HST) driven by the engine. The HST includes a hydraulic pump driven by the engine, at least one hydraulic motor of a variable-displacement type that is connected in a closed circuit to the hydraulic pump, and a clutch unit coupled to an output shaft of the hydraulic motor. The HST transmits the motive power of the engine to the axle of wheels hydromechanically.

Also, the commercialized traveling systems for wheel loaders and other engineering machines include a type comprising a torque converter and a transmission and constructed to transmit the motive power of an engine to the axle of wheels hydromechanically.

Patent Document 1: JP, A 11-230333

DISCLOSURE OF THE INVENTION

Problems to be Solved by the Invention

Engineering machines may have the respective maximum traveling speeds limited according to the particular site or country.

Diesel engines of the mechanical control governor type were prevailing in wheel loaders and other engineering machines, but in recent years, regulations on exhaust gas emissions have been tightened and these diesel engines are being replaced by engines of the electronic control governor type.

Some of the engineering machines whose engines are of the mechanical control governor type and whose travel devises include a torque converter and a transmission have a mechanical stopper on the accelerator pedal or governor lever of the machine to limit the maximum engine speed mechanically for a limited maximum traveling speed. In this case, however, since the maximum engine speed is limited during work mode as well as during travel mode, the operating output horsepower of the engine cannot be fully utilized, which reduces working efficiency. In addition, since the maximum engine speed is limited regardless of the traveling speed, the maximum rated engine speed cannot be obtained when traveling is started, and thus the accelerating performance of the machine decreases during the start of traveling.

For such an HST-equipped travel device as described in Patent Document 1, the tilting mechanism (swash plate) of a hydraulic motor may have a mechanical stopper to limit the minimum tilt of the hydraulic motor and thus limit the motor output speed for a limited maximum traveling speed. In this case, however, the maximum engine speed is not limited, so when an operator fully steps on an accelerator pedal, engine output horsepower is lost according to the vehicle speed limited when the maximum traveling speed is limited.

An object of the present invention is to provide a traveling system for an engineering machine, adapted to limit a maximum traveling speed of the machine without causing decreases in engineering work efficiency or in accelerating performance during a start of traveling, and to improve fuel efficiency by suppressing a loss of engine output horsepower under the limited state of the maximum traveling speed.

Means for Solving the Problems (1) In order to attain the above object, the present invention provides a traveling system for an engineering machine comprising: an engine, a travel device driven by the engine, a multi-speed motive power transmission provided on the travel device, and gear selection means for selecting a gear of the motive power transmission, the traveling system further comprising: vehicle speed detection means; and engine control means for limiting a maximum engine speed to a preset first engine speed limit lower than a maximum rated engine speed, during the gear selection means is selecting a required gear that is either the highest gear or the next highest gear, when an actual vehicle speed detected by the vehicle speed detection means approaches a preset vehicle speed limit.

In this way, during the selection of either the highest gear or the next highest gear as the required gear by the gear selection means, when the actual vehicle speed approaches the vehicle speed limit, the maximum engine speed is limited to the first engine speed limit. Therefore, a traveling speed corresponding to the engine speed can be obtained and thus a maximum traveling speed limited.

In addition, in work mode, a trifle low gear is usually selected for the engineering machine to work and for control purposes, the maximum engine speed is not limited to the engine speed limit. Selection of a trifle high gear (either the highest gear or the next highest gear) also makes the vehicle travel slow during work and usually keeps the actual vehicle speed away from the vehicle speed limit. Even in that case, therefore, the maximum engine speed is not limited to the engine speed limit, either. Accordingly, when an accelerator pedal is fully stepped on by an operator, the engine speed increases to the maximum rated engine speed and working efficiency does not decrease.

Furthermore, during a start of traveling, the actual vehicle speed is also kept away from the vehicle speed limit and the maximum engine speed is not limited to the first engine speed limit, so the full stepping-on of the accelerator pedal provides the maximum rated engine speed and does not reduce accelerating performance.

Besides, even when the accelerator pedal is fully stepped on by the operator, as the actual vehicle speed approaches the vehicle speed limit, the maximum engine speed is limited to the first engine speed limit, whereby a loss of engine output horsepower under a limited state of the maximum traveling speed is suppressed and fuel efficiency improves.

(2) In order to attain the foregoing object, the present invention provides a traveling system for an engineering machine comprising: an engine), a travel device driven by the engine, a multi-speed motive power transmission provided on the travel device, and gear selection means for selecting a gear of the motive power transmission, the motive power transmission being an HST including, in addition to a hydraulic pump driven by the engine, at least one hydraulic motor of a variable-displacement type connected in a closed circuit to the hydraulic pump, the traveling system further comprising: vehicle speed detection means; motor control means for controlling the capacity of the hydraulic motor according to an actual vehicle speed detected by the vehicle speed detection means, and limiting a minimum capacity of the hydraulic motor to a preset capacity limit during selection of either the highest gear or the next highest gear as a required gear by the gear selection means when the actual vehicle speed reaches a preset vehicle speed limit; and engine control means for limiting a maximum engine speed to a preset first engine speed limit lower than a maximum rated engine speed, during the selection of either the highest gear or the next highest gear as the required gear by the gear selection means, when an actual vehicle speed detected by the vehicle speed detection means (55, 56b, 56c) approaches a preset vehicle speed limit.

In this way, during the selection of either the highest gear or the next highest one as the required gear by the gear selection means, when the actual vehicle speed approaches the vehicle speed limit, the minimum capacity of the hydraulic motor is limited and upon the approach of the actual vehicle speed to the vehicle speed limit, the maximum engine speed is limited to the first engine speed limit. Thus, a maximum traveling speed can be limited more accurately and more reliably than in a case that only the maximum engine speed is limited.

In addition, as described in above item (1), in work mode, since the maximum engine speed is not limited to the engine speed limit, when an accelerator pedal is fully stepped on by an operator, the engine speed increases to the maximum rated engine speed and working efficiency does not decrease. Furthermore, during a start of traveling, the actual vehicle speed is also kept away from the vehicle speed limit and thus the maximum engine speed is not limited to the first engine speed limit, so the full stepping-on of the accelerator pedal provides the maximum rated engine speed and does not reduce accelerating performance. Besides, even when the accelerator pedal is fully stepped on by the operator, as the actual vehicle speed approaches the vehicle speed limit, the maximum engine speed is limited to the first engine speed limit, whereby a loss of engine output horsepower under a limited state of the maximum traveling speed is suppressed and fuel efficiency improves.

(3) The traveling system for the engineering machine further comprising: an accelerator pedal that indicates a basic target speed of the engine; and an electronic control governor that controls a fuel injection rate of the engine; wherein the engine control means operates to compute a control target engine speed that is intended to decrease from the target engine speed to the first engine speed limit as the actual vehicle speed approaches the vehicle speed limit, and output the computed control target engine speed to the electronic control governor, when the accelerator pedal is indicating a target engine speed higher than the first engine speed limit.

Thus, as the actual vehicle speed approaches the vehicle speed limit, the engine speed gradually goes down to the first engine speed limit, whereby the maximum engine speed can be limited to the first engine speed limit smoothly.

(4) The traveling system for the engineering machine wherein the engine control means includes: first means for calculating a deviation between the actual vehicle speed and the vehicle speed limit, and computing a control engine speed limit that is intended to decrease from the maximum rated engine speed to the first engine speed limit as the vehicle speed deviation decreases, when the calculated vehicle speed deviation decreases below a required value and second means for outputting the computed control engine speed limit as the control target engine speed when the target engine speed that the accelerator pedal indicates is higher than the computed control engine speed limit.

Thus, as the actual vehicle speed approaches the vehicle speed limit, the engine speed gradually goes down to the first engine speed limit, whereby the maximum engine speed can be limited to the first engine speed limit smoothly.

(5) The traveling system for the engineering machine wherein the HST includes two hydraulic motors of the variable-displacement type connected as first and second hydraulic motors in a closed circuit to the hydraulic pump, the motors being connected in parallel to each other; and the motor control means controls the capacities of the first and second hydraulic motors such that as the actual vehicle speed detected by the vehicle speed detection means increases, the capacity of the first hydraulic motor is reduced progressively and the second hydraulic motor is fixed at a maximum capacity, and such that when the capacity of the first hydraulic motor reaches a minimum capacity, the capacity of the second hydraulic motor is reduced progressively and the first hydraulic motor is fixed at the minimum capacity; the motor control means controls the capacity of the second hydraulic motor not so as to exceed the capacity limit, when the actual vehicle speed reaches the vehicle speed limit, during the gear selection means is selecting the required gear.

Thus, the capacities of the first and second hydraulic motors can be controlled in coordinative fashion and efficient, smooth vehicle speed control becomes possible.

(6) Furthermore, in the traveling system outlined in above item (1) or (2), the vehicle speed limit may be changeable using external setting means, in which case, the engine control means preferably makes the first engine speed limit changeable according to the particular vehicle speed limit.

Thus, the vehicle speed limit can be changed to an optimal value from the outside according to a particular situation, and hence, the traveling system can be enhanced in versatility. In addition, since the first engine speed limit can be changed according to the particular vehicle speed limit, an optimal engine speed limit corresponding to the vehicle speed limit can be set.

(7) Moreover, in the traveling system outlined in above item (2), the motor control means preferably sets the vehicle speed limit to stay within a vehicle speed range of the gear next highest to the highest gear, and when the gear selection means is selecting the highest gear and when the gear selection means is selecting the next highest gear, limits the minimum capacity of the hydraulic motor to the capacity limit independently for each of the two selected gears upon an arrival of the actual vehicle speed at the preset vehicle speed limit; and when the gear selection means is selecting the gear next highest to the highest gear, the engine control means limits the maximum engine speed to the first engine speed limit upon the approach of the actual vehicle speed at the vehicle speed limit, and when the gear selection means is selecting the highest gear, the engine control means limits the maximum engine speed to the second engine speed limit lower than the first engine speed limit.

Thus, when the gear selection means is selecting the highest gear or the next highest gear, the maximum engine speed is limited to the first engine speed limit or the second engine speed limit, and hence, as discussed in above item (2), the maximum traveling speed can be limited without decreases in the engineering work efficiency of the vehicle during work mode or in the accelerating performance of the vehicle during the start of traveling. Also, a loss of engine output horsepower under the limited state of the maximum traveling speed is suppressed and fuel efficiency improves. Additionally, when the gear selection means is selecting the highest gear, since the engine control means limits the maximum engine speed to the second engine speed limit lower than the first engine speed limit, any loss of engine output horsepower at the limited maximum traveling speed is suppressed even more effectively and fuel efficiency further improves.

(8) Besides, in the traveling system outlined in above item (7), the vehicle speed limit may be changeable using external setting means, in which case, the engine control means preferably makes the first and second engine speed limits changeable to fit the respective vehicle speed limits.

Thus, as described in above item (5), the vehicle speed limit can be changed to the optimal value from the outside according to the particular situation, and hence, the traveling system can be enhanced in versatility. In addition, since the first and second engine speed limits are each made changeable according to the particular vehicle speed limit, both the first and second engine speed limits can be set to equal the optimal engine speed limit corresponding to the vehicle speed limit.

Effects of the Invention

According to the present invention, the maximum traveling speed can be limited without decreases in the working efficiency of the vehicle during work mode or in the accelerating performance of the vehicle during the start of traveling. In addition, any loss of engine output horsepower under the limited state of the maximum traveling speed is suppressed and fuel efficiency can be improved.

LEGEND

Figure 1:
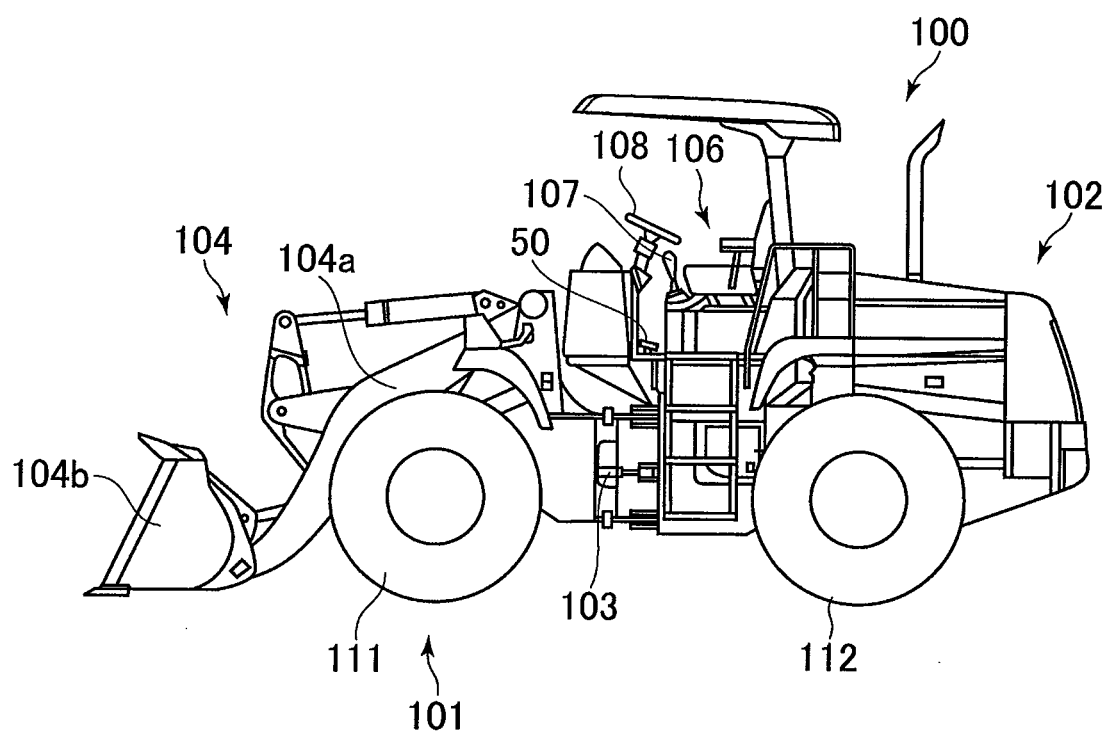
FIG. 1 is an external view of a wheel loader which is an example of an engineering machine applying an HST traveling system of the present invention.

10 Engine
11 Closed-circuit hydraulic drive system
12 Clutch unit
13 HST
14 Propeller shaft
15 Travel device
20 Hydraulic pump
21a, 22a, 21b, 22b, 21c, 22c Main lines
23 First hydraulic motor
24 Second hydraulic motor
25, 26 Tilt control actuator
27, 28 Solenoid proportional valves
30 First clutch (Motor clutch)
31-34 First to fourth gears
35 Second clutch (Forward traveling clutch)
36, 37 Fifth and sixth gears
38 Third clutch (Reversing clutch)
39, 40 Seventh and eighth gears
42, 43, 44 Solenoid selector valves
50 Accelerator pedal
51 Forward/reverse traveling selector switch
52 Gearshift switch
54 Engine speed sensor
55 HST output shaft speed sensor
56 HST controller
56A HST controller
56a Engine speed computing section
56b HST output shaft speed computing section
56c Vehicle speed computing section
56d Forward/reverse traveling switch state discriminator
56e Gearshift switch state discriminator
56f Sensor/switch error discriminator
56g Parameter storage unit
56h HST control unit
56j Communication unit
56m Input terminal
57 Engine controller
58 Communication line
61 External setter
100 Wheel loader
111 Front wheel
112 Rear wheel
561 Traveling control section 561a Motor control section
561b Forward/reverse traveling control section
562 Engine speed limit computing section
562a Vehicle speed limit acquiring section
562b Vehicle speed deviation computing section
562c First correction engine speed computing section
562d First engine speed limit acquiring section
562e Engine speed limit correcting section
562f Maximum engine speed acquiring section
562g First switching section
562j Second correction engine speed computing section
562k Second switching section
562m Second engine speed limit acquiring section
562n Third switching section
562p First engine speed limit computing section
562q Second engine speed limit computing section
571 Basic target engine speed computing section
572 Target engine speed determining section
Scmax Vehicle speed limit
q2cmin Tilting amount limit
Ncmax1 First engine speed limit
Ncmax2 Second engine speed limit
Ncmaxb Engine speed limit for control
Ncmaxa Correction engine speed limit
ΔS Vehicle speed deviation
ΔNa Correction engine speed

BEST MODE FOR CARRYING OUT THE INVENTION

Hereunder, embodiments of the present invention will be described using the accompanying drawings.

FIG. 1 is an external view of a wheel loader which is an example of an engineering machine applying an HST traveling system of the present invention. Referring to FIG. 1, the wheel loader 100 includes a vehicle front 101 and a vehicle rear 102, both pivotally pin-coupled to each other, the vehicle front 101 and the vehicle rear 102 constituting the vehicle body. The vehicle front 101 has a front work device 104 including a boom 104a and a bucket 104b. The vehicle rear 102 has a cabin 106, in which are provided an control lever unit 107 for controlling the front operating device 104, a steering wheel 108 for steering the vehicle, an accelerator pedal 50 for controlling an engine speed, and controls such as the forward/reverse traveling selector switch 51 and gearshift switch 52 described later herein (also, see FIGS. 3 and 4, respectively). The vehicle front 101 and the vehicle rear 102 also have a front wheel 111 and a rear wheel 112, respectively.

Figure 2:
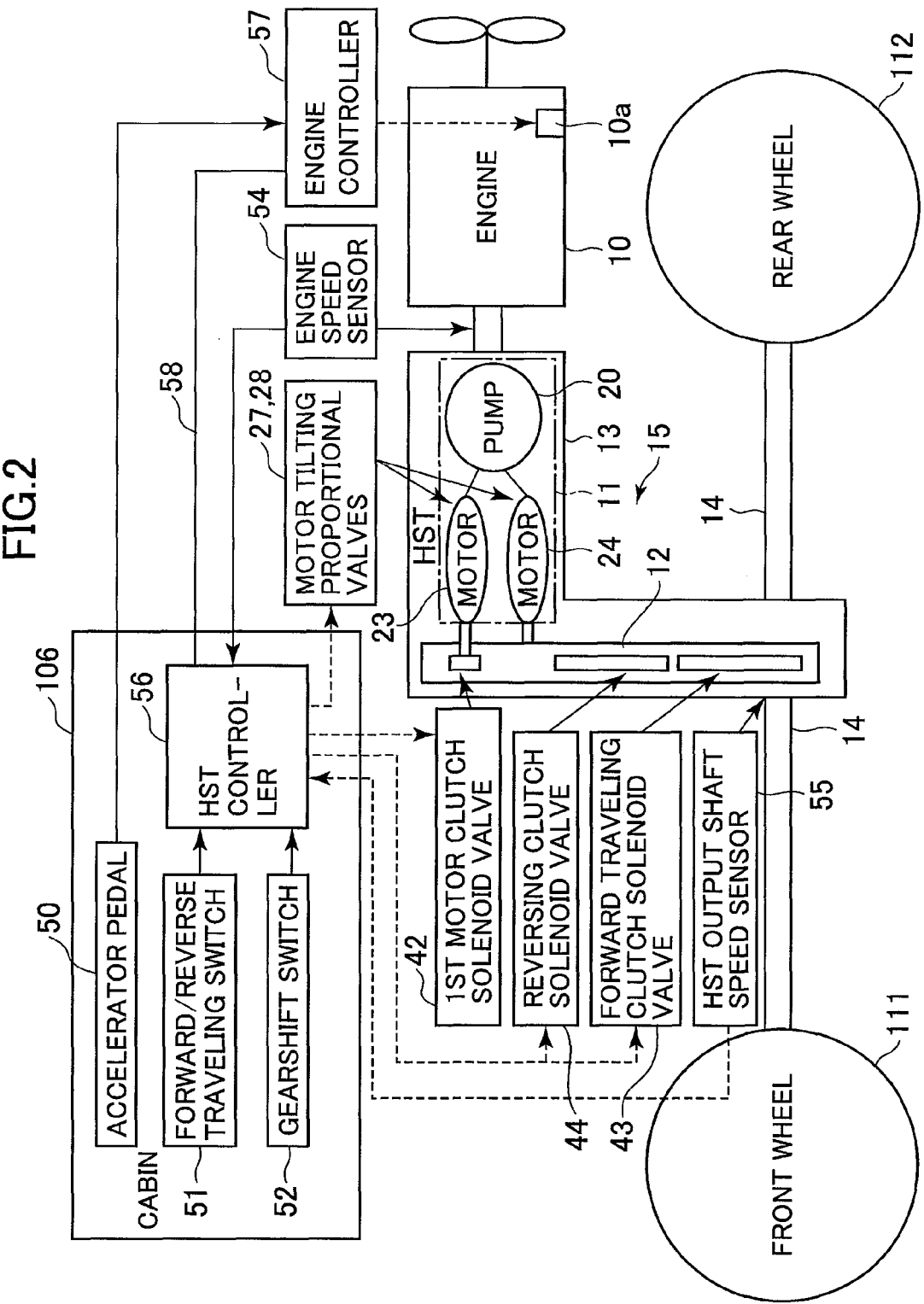
FIG. 2 is a schematic diagram showing a total configuration of the HST traveling system in the wheel loader (engineering vehicle) according to an embodiment of the present invention.

FIG. 2 is a schematic diagram showing a total configuration of the HST traveling system in the wheel loader (engineering vehicle) 100 according to an embodiment of the present invention.

The HST traveling system for the wheel loader 100 in FIG. 2 includes an engine 10 and a travel device 15 driven by the engine 10. In addition to a hydrostatic transmission (HST) 13 with a closed-circuit hydraulic drive system 111 and with a clutch unit 112, the travel device 15 includes a propeller shaft 14 and the above-mentioned front wheel 11 and rear wheel 12. Motive power of the engine 10 is transmitted to the HST 13, from which the engine power is then further transmitted to the front wheel 111 and the rear wheel 112 via the propeller shaft 14.

Figure 3:
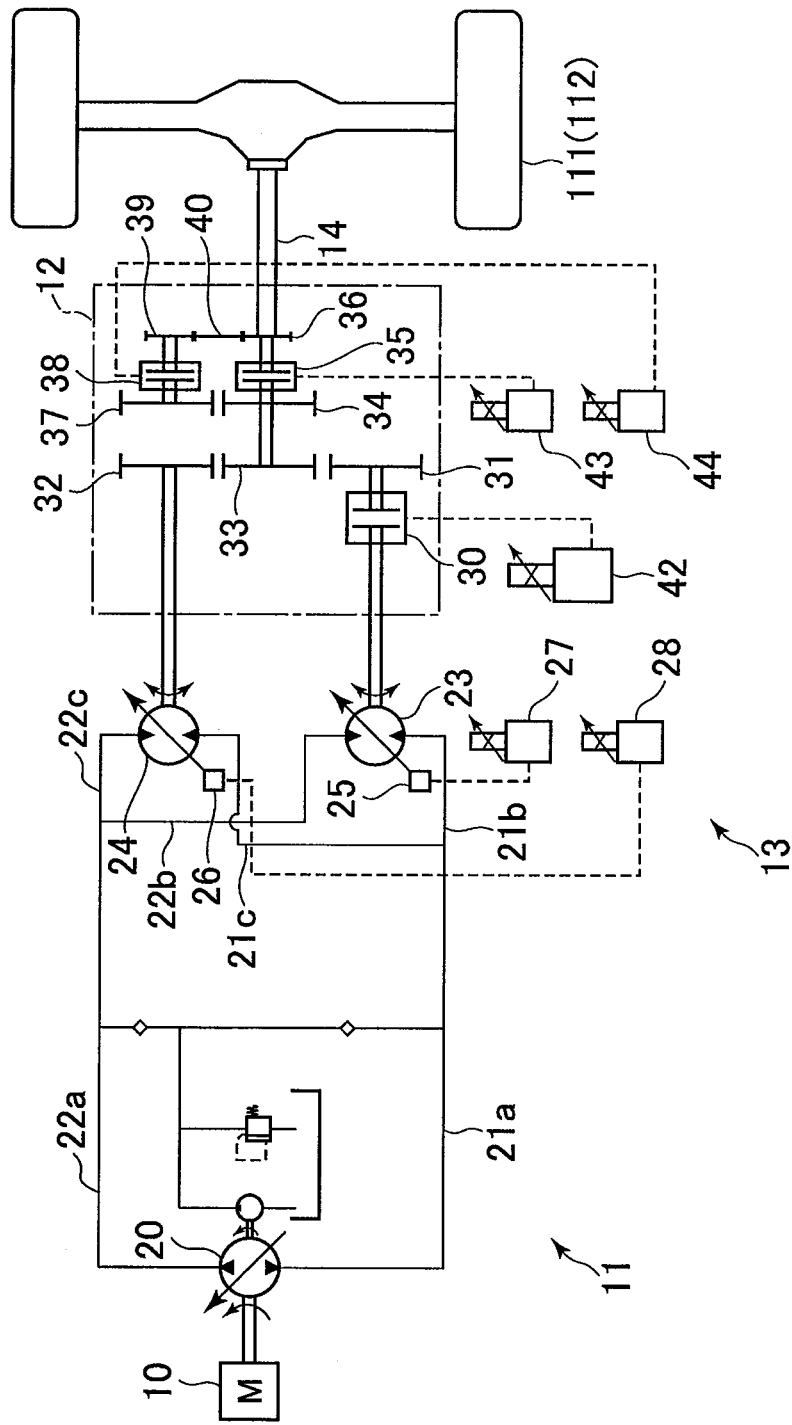
FIG. 3 is a diagram that shows details of the HST.

FIG. 3 is a diagram that shows details of the HST 13.

As shown in FIG. 3, the HST 13 has the closed-circuit hydraulic drive system 11 and the clutch unit 12. The closed-circuit hydraulic drive system 11 includes a bilaterally tiltable, variable-displacement hydraulic pump 20 driven by the engine 10, a variable-displacement type of first hydraulic motor 23 connected in closed-circuit form to the hydraulic pump 20 via one pair of main lines, 21a, 22a and 21b, 22b, and a variable-displacement type of second hydraulic motor 24 connected in closed-circuit form to the hydraulic pump 20 via one pair of main lines, 21a, 22a and 21c, 22c, and also connected in parallel to the first hydraulic motor 23. The first and second hydraulic motors 23, 24 each have, as respective tilt control elements, tilt control actuators 25, 26 and solenoid proportional valves 27, 28, respectively. Upon control of the solenoid proportional valves 27, 28, the tilt control actuators 25, 26 are controlled, whereby tilting amounts (motor capacities) of the first and second hydraulic motors 23, 24 are controlled.

The clutch unit 12 includes: a first gear 31 coupled to an output shaft of the first hydraulic motor 23 via a first clutch 30; a second gear 32 coupled to an output shaft of the second hydraulic motor 24; a third gear 33 that meshes with the first gear 31 and the second gear 32; a fourth gear 34 coupled to an output shaft of the third gear 33; a fifth gear 36 connected to an output shaft of the fourth gear 34 via a second clutch 35; a sixth gear 37 that meshes with the fourth gear 34; a seventh gear 39 connected to the sixth gear 37 via a third clutch 38; and an eighth gear 40 that meshes with the fifth gear 36 and the seventh gear 39; the eighth gear 40 being coupled at its output shaft to the propeller shaft 14.

The first clutch 30 is a motor clutch that switches a state of connection between the first hydraulic motor 23 and the propeller shaft 14, the second clutch 35 is a clutch for forward traveling, and the third clutch 38 is a clutch for reverse traveling. Solenoid selector valves 42, 43, and 44 are provided for the first to third clutches 30, 35, and 38, respectively, and the first to third clutches 30, 35, and 38 are engaged or disengaged by ON or OFF actions of the solenoid selector valves 42, 43, and 44, respectively.

Referring back to FIG. 2, the HST traveling system for the wheel loader 100 has the accelerator pedal 50, the forward/reverse traveling selector switch 51, and the gearshift switch 52, as operating elements for operating the engine 10, the closed-circuit hydraulic drive system 11, and the clutch unit 12, respectively. In addition, the HST traveling system has an engine speed sensor 54, an HST output shaft speed sensor 55, an HST controller 56, and an engine controller 57, as control elements for the engine 10, the closed-circuit hydraulic drive system 11, and the clutch unit 12. The HST controller 56 and the engine controller 57 are interconnected via a communication line 58, constituting a vehicle body network.

The HST controller 56 receives not only operating signals as input signals from the forward/reverse traveling selector switch 51 and the gearshift switch 52, but also detection signals as other input signals from the engine speed sensor 54 and the HST output shaft speed sensor 55. The HST controller 56 also conducts required computations and outputs control signals to the solenoid proportional valves 27, 28 and the solenoid selector valves 42, 43, and 44. The engine controller 57 receives an operating signal and a command signal, as input signals, from the accelerator pedal 50 and the HST controller 56, respectively, then after conducting a required computation, controls an output torque and engine speed of the engine 10 by controlling an electronic control governor 10a of the engine 10.

Figure 4:
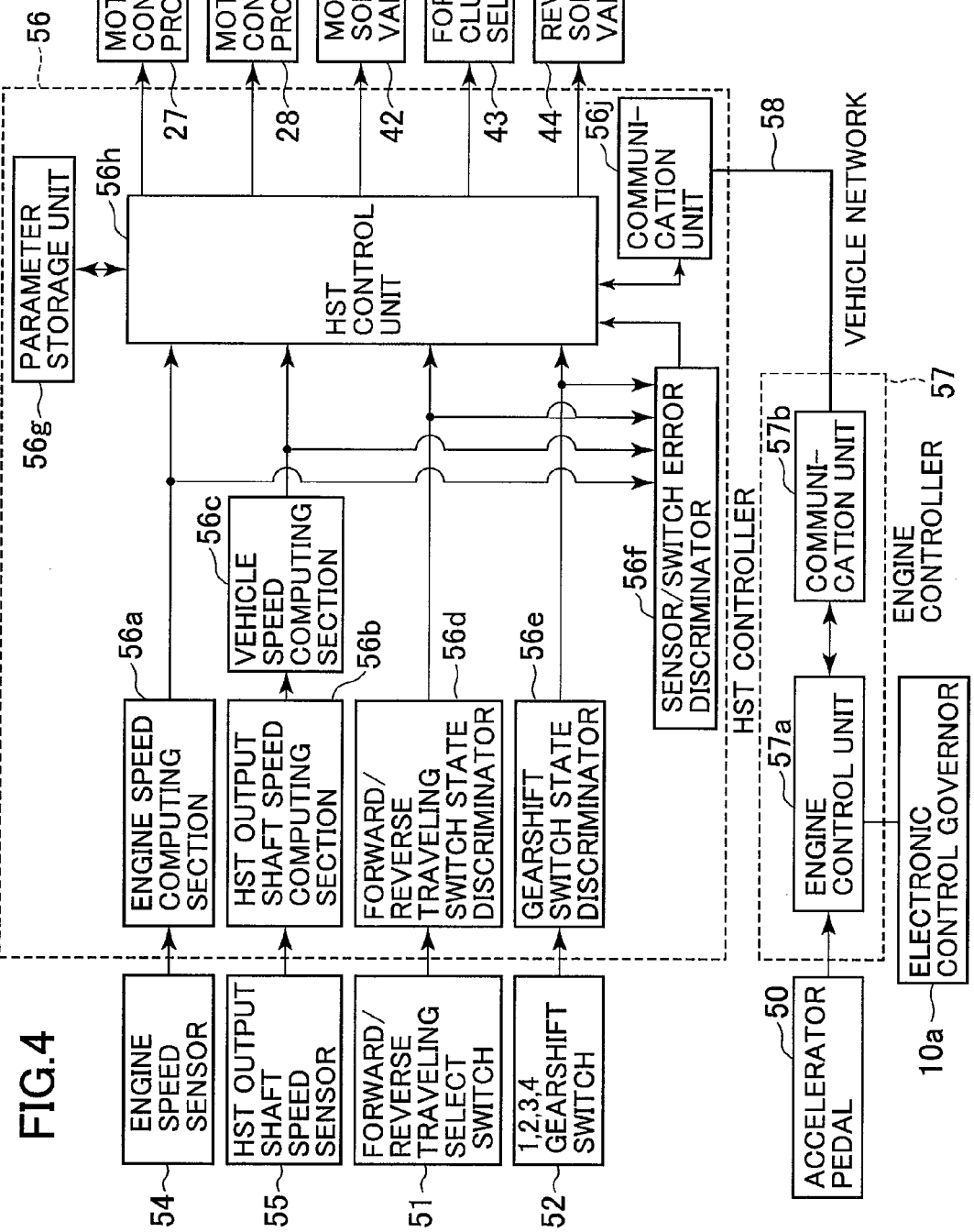
FIG. 4 is a diagram that shows functional details of an HST controller and an engine controller.

FIG. 4 is a diagram that shows functional details of the HST controller 56 and the engine controller 57.

The HST controller 56 includes, as its computing functional elements, an engine speed computing section 56a, an HST output shaft speed computing section 56b, a vehicle speed computing section 56c, a forward/reverse traveling switch state discriminator 56d, a gearshift switch state discriminator 56e, a sensor/switch error discriminator 56f, a parameter storage unit 56g, an HST control unit 56h, and a communication unit 56j.

The engine controller 57 includes, as its computing functional elements, an engine control unit 57a and a communication unit 57b.

The engine speed computing section 56a in the HST controller 56 receives a detection signal as an input signal from the engine speed sensor 54 and then computes an actual engine speed of the engine 10. The HST output shaft speed computing section 56b receives a detection signal as its input signal from the HST output shaft speed sensor 55 and then computes an output shaft speed of the HST. The vehicle speed computing section 56c computes a vehicle speed (traveling speed of the wheel loader), based upon the computed HST output shaft speed. The forward/reverse traveling switch state discriminator 56d receives an operating signal as its input signal from the forward/reverse traveling selector switch 51 and determines whether a setting of the forward/reverse traveling selector switch 51 is forward traveling or reverse traveling. The gearshift switch state discriminator 56e receives an operating signal as its input signal from the gearshift switch 52 and discriminates a gear selected using the gearshift switch 52. The engine speed computing section 56a, the vehicle speed computing section 56c, the forward/reverse traveling switch state discriminator 56d, and the gearshift switch state discriminator 56e transmit the respective computation results and discrimination results as input signals to the sensor/switch error discriminator 56f and the HST control unit 56h. On the basis of the computation results and discrimination results received from the engine speed computing section 56a, the vehicle speed computing section 56c, the forward/reverse traveling switch state discriminator 56d, and the gearshift switch state discriminator 56e, the sensor/switch error discriminator 56f discriminates any errors in the forward/reverse traveling selector switch 51, the gearshift switch 52, the engine speed sensor 54, and the HST output shaft speed sensor 55, and transmits error discrimination results as its input signal to the HST control unit 56h. The parameter storage unit 56g contains internally stored parameters used to conduct control computations on the parameters described later herein, such as a vehicle speed limit Scmax, a first engine speed limit Ncmax1, and a maximum rated engine speed Nmax of the engine 10. The communication unit 56j, connected to the communication unit 57b of the engine controller 57 via the communication line 58, receives information from the HST control unit 56h and transfers the received information to the engine controller 57. The communication unit 56j also receives information from the engine controller 57 and provides the received information to the HST control unit 56h.

Figure 5:
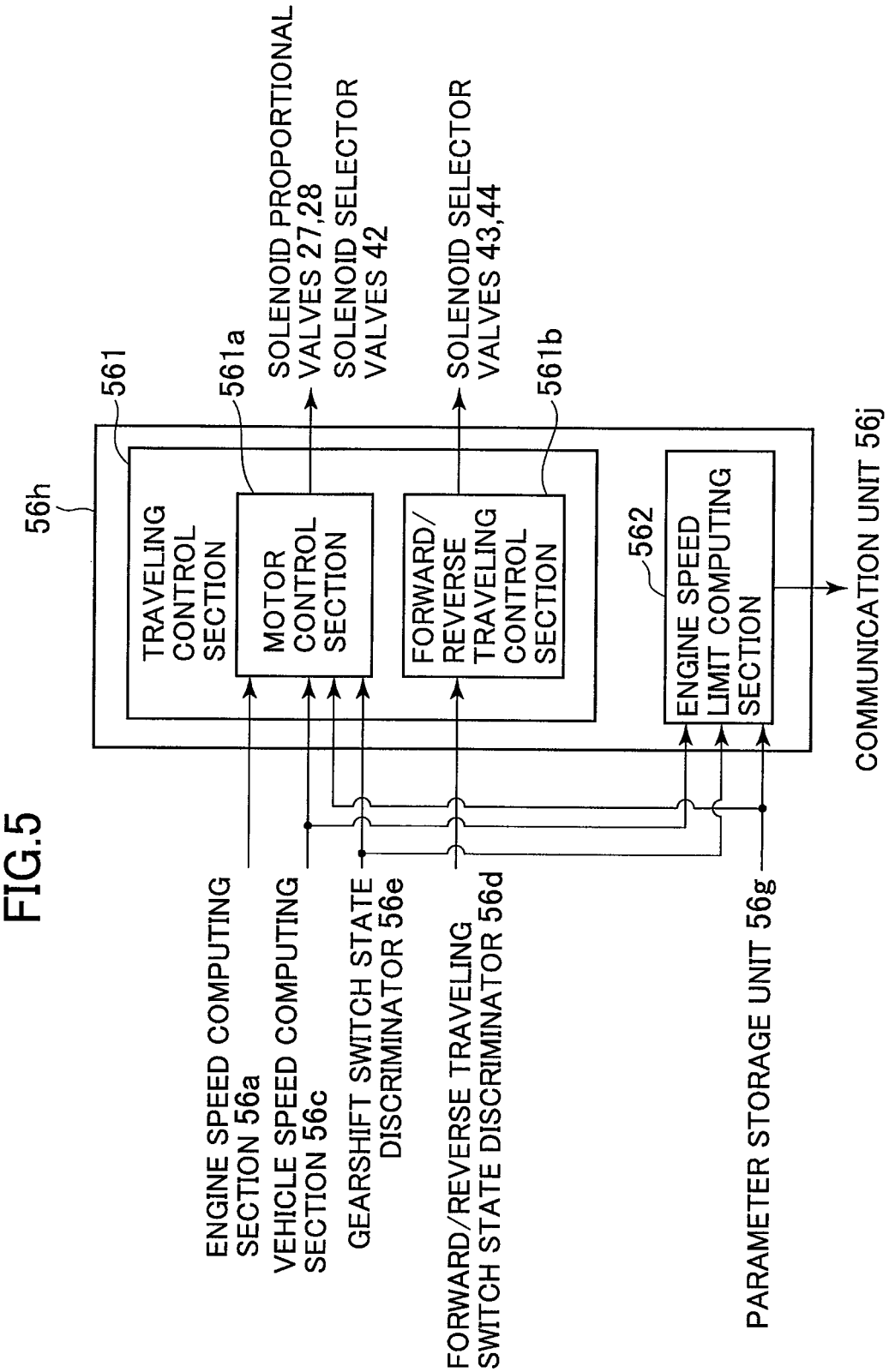
FIG. 5 is a diagram that shows a process outline of an HST control unit of the HST controller.

FIG. 5 is a diagram that shows a process outline of the HST control unit 56h. The HST control unit 56h includes a traveling control section 561 and an engine speed limit computing section 562, and the traveling control section 561 has a motor control section 561a and a forward/reverse traveling control section 561b.

The motor control section 561a receives, as its input signals, the computation results obtained by the engine speed computing section 56a and the vehicle speed computing section 56c, the discrimination results by the gearshift switch state discriminator 56e, and the vehicle speed limit Scmax stored within the parameter storage unit 56g. The motor control section 561a also conducts required computations and outputs control signals to the solenoid proportional valves 27, 28 and the solenoid selector valve 42. The forward/reverse traveling control section 561b receives, as its input signal, the discrimination results obtained by the forward/reverse traveling switch state discriminator 56d. In addition, if the received discrimination results indicate forward traveling, the forward/reverse traveling control section 561b outputs a control signal to the solenoid selector valve 43 for the forward traveling clutch. If the received discrimination results indicate reverse traveling, the forward/reverse traveling control section 561b outputs a control signal to the solenoid selector valve 44 for the reverse traveling clutch. The engine speed limit computing section 562 receives, as its input signals, the computation results obtained by the vehicle speed computing section 56c, the discrimination results by the gearshift switch state discriminator 56e, and the vehicle speed limit Scmax and first engine speed limit Ncmax1 stored within the parameter storage unit 56g. The engine speed limit computing section 562 also conducts required computations and outputs a control engine speed limit Ncmaxb to the communication unit 56j. The engine speed limit Ncmaxb, described later herein, is transmitted to the engine controller 57 via the communication line 58.

Referring back to FIG. 4, the engine control unit 57a in the engine controller 57 receives an operating signal as an input signal from the accelerator pedal 50, then after computing a target engine speed of the engine 10 and selecting the target engine speed or the control engine speed limit Ncmaxb earlier received from the communication unit 57b via the communication line 58, whichever is the smaller, and outputs the selected speed as a command signal to the electronic control governor 10a.

Details of the computing process by the motor control section 561a in the HST control unit 56h of FIG. 5 are described below using FIGS. 6 to 11.

Figure 6:
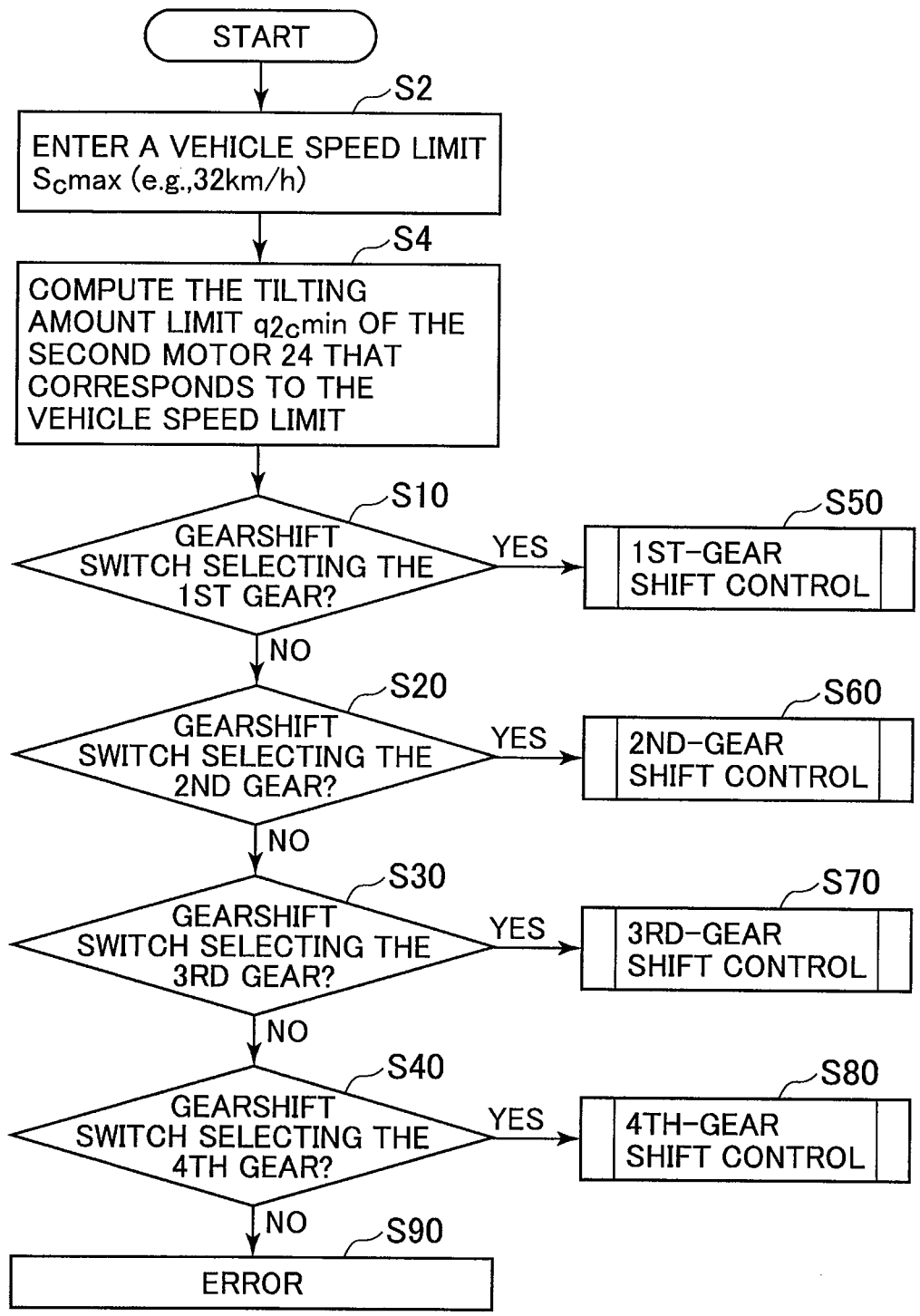
FIG. 6 is a flowchart relating to an entire computing process in a motor control section of the HST control unit.

FIG. 6 is a flowchart relating to the entire computing process in the motor control section 561a. Referring to FIG. 6, the motor control section 561a first reads out the vehicle speed limit Scmax from the parameter storage unit 56g (step S2), and after referring to the target tilt characteristics shown in FIG. 7 and calculating an associated tilting amount limit q2cmin of the second hydraulic motor 24, saves both the vehicle speed limit Scmax and the tilting amount limit q2cmin in a storage unit such as a RAM (step S4). The vehicle speed limit is 32 km/h, for example.

Figure 8:
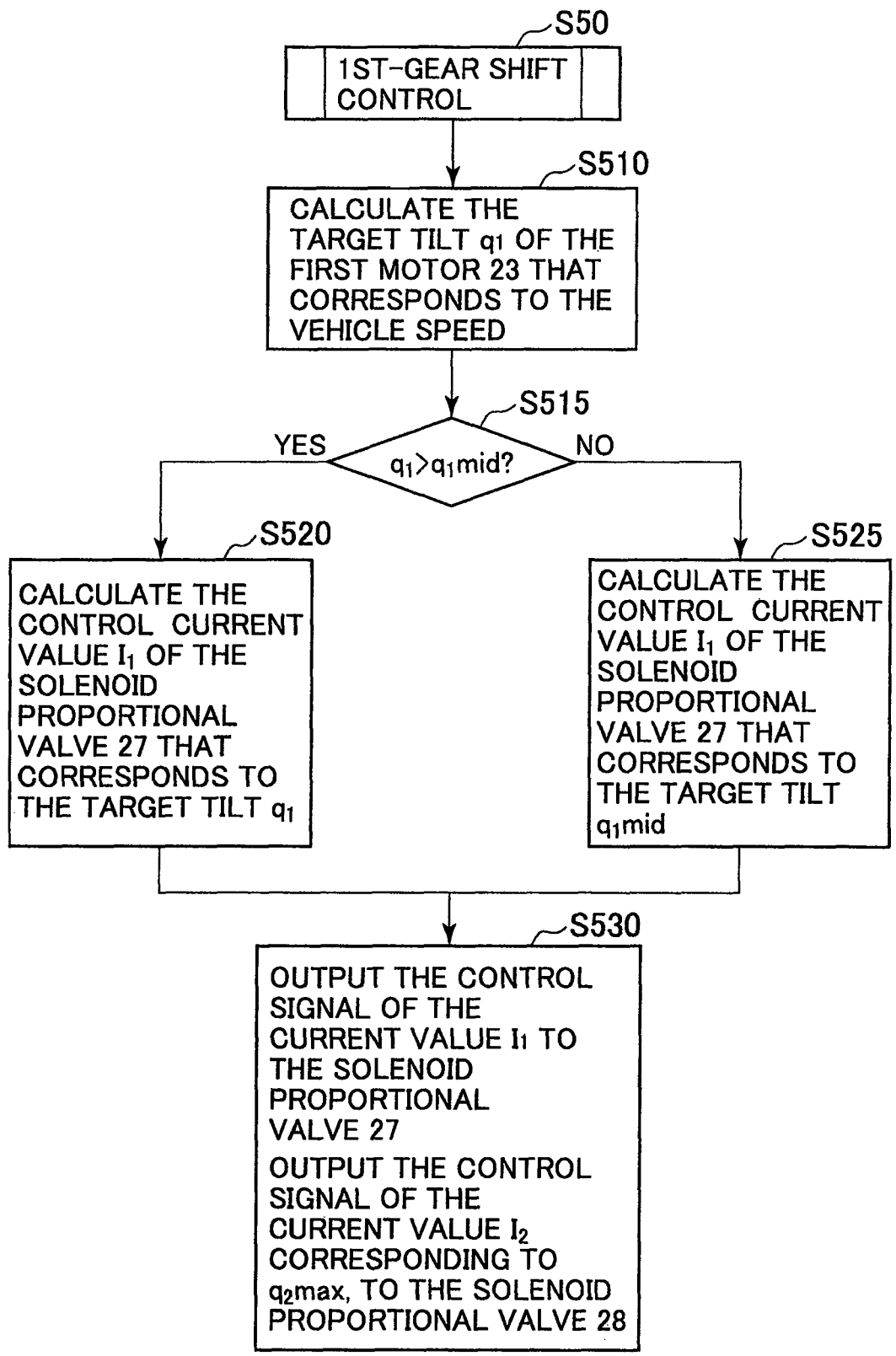
FIG. 8 is a flowchart showing a computing process used when a gearshift switch is selecting a first gear (first speed range)
Figure 9:
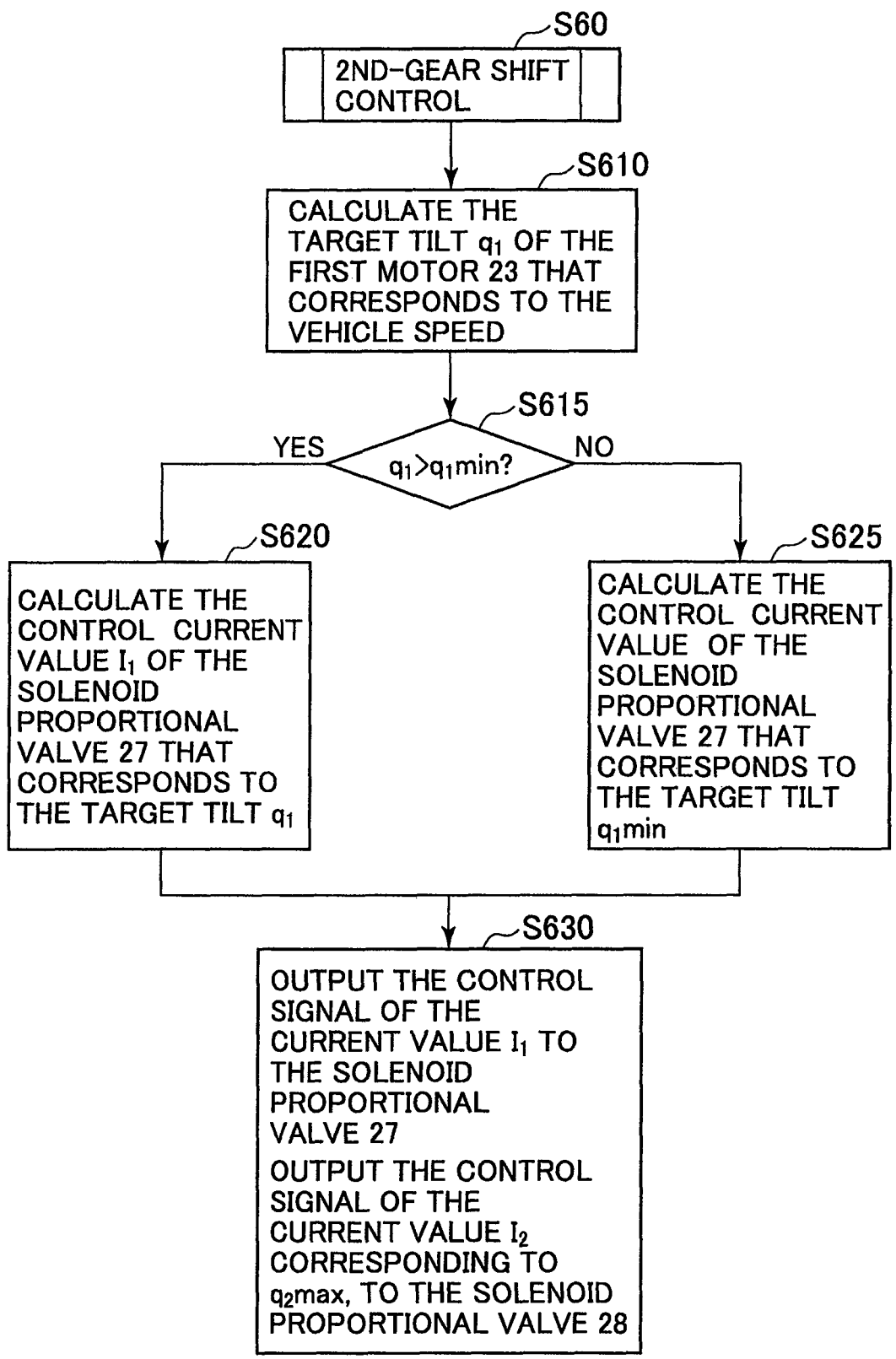
FIG. 9 is a flowchart showing a computing process used when the gearshift switch is selecting a second gear (second speed range)
Figure 10:
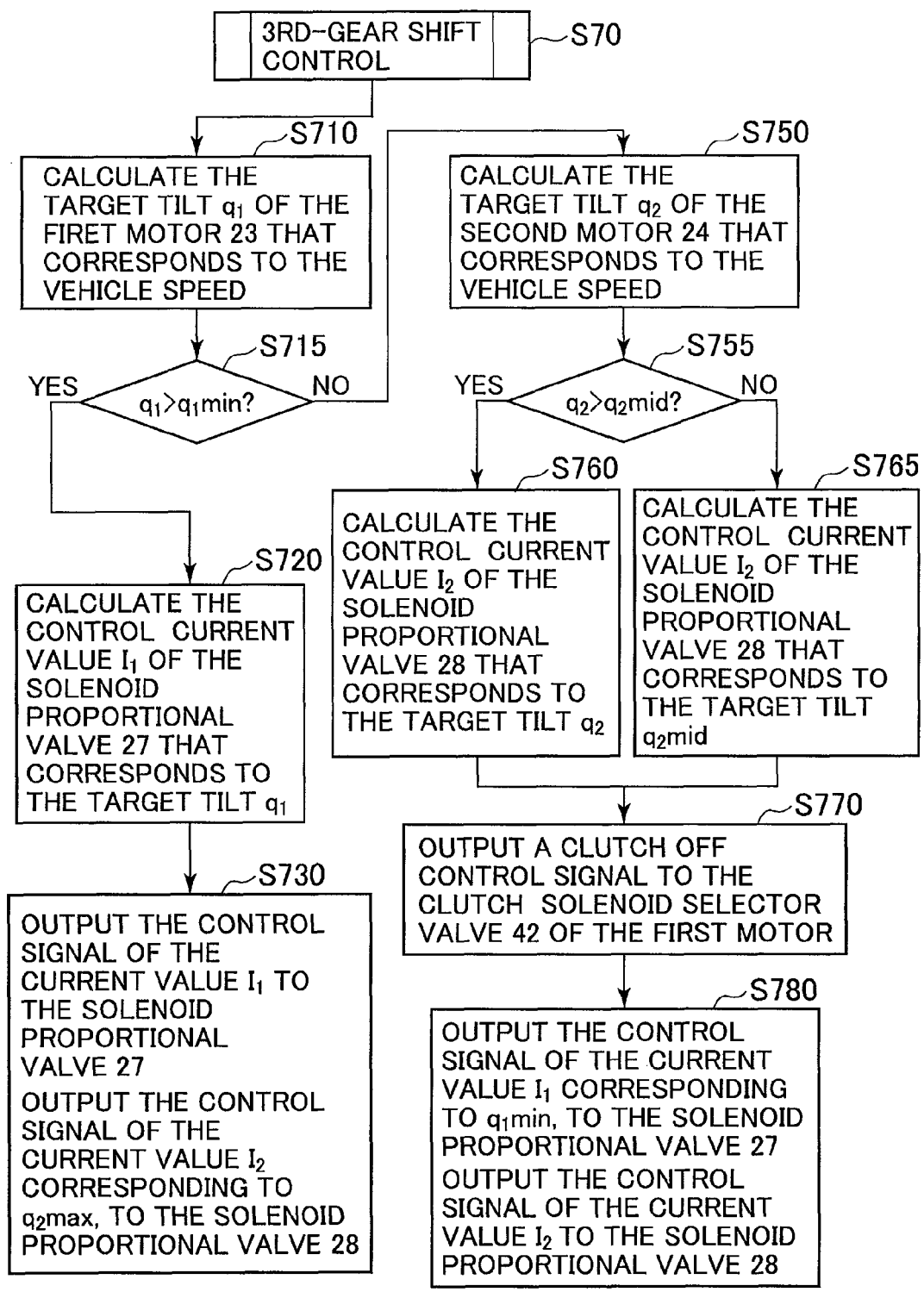
FIG. 10 is a flowchart showing a computing process used when the gearshift switch is selecting a third gear (third speed range)
Figure 11:
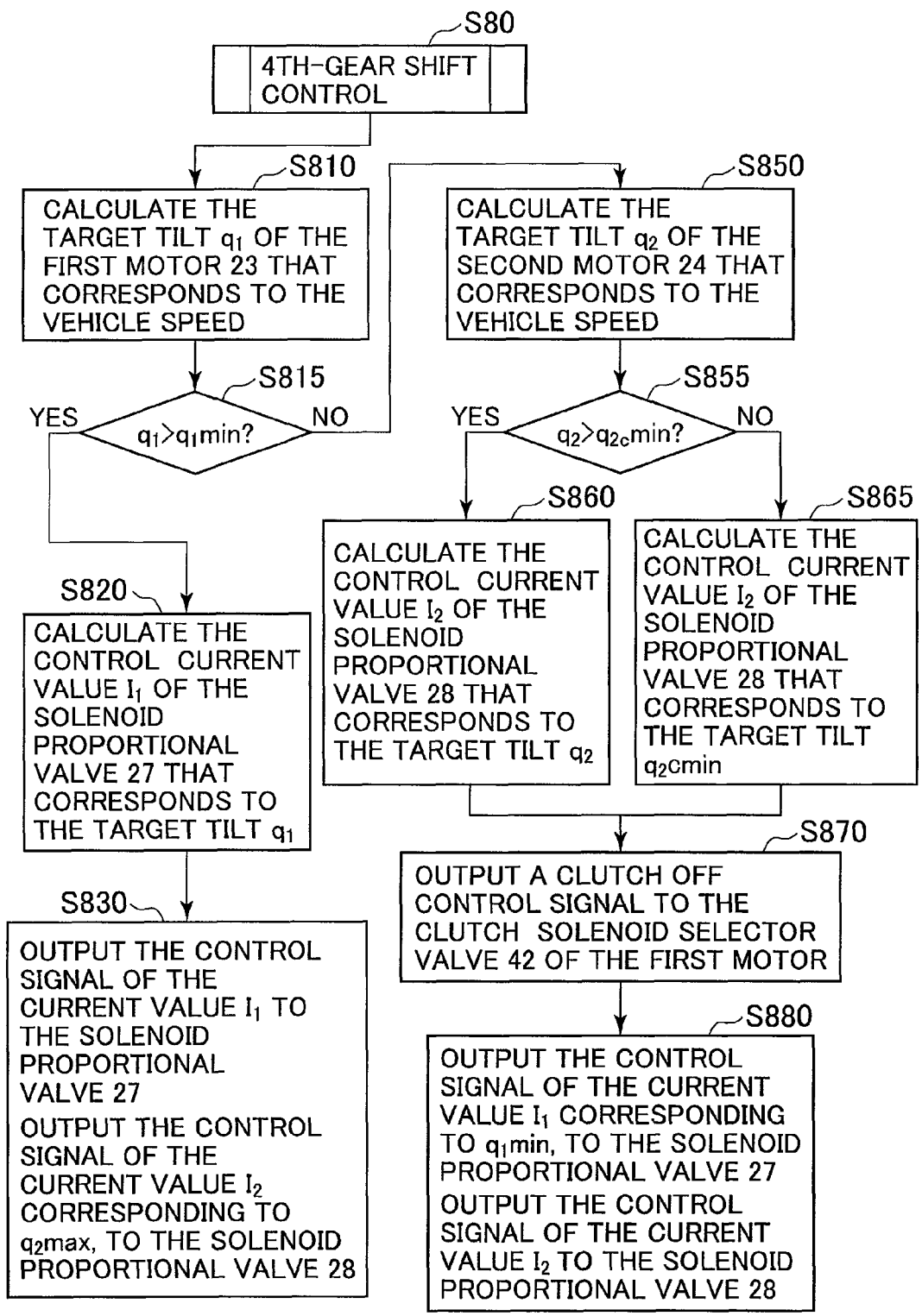
FIG. 11 is a flowchart showing a computing process used when the gearshift switch is selecting a fourth gear (fourth speed range)

Next, the motor control section 561a discriminates whether a first gear (first speed range), a second gear (second speed range), a third gear (third speed range), or a fourth gear (fourth speed range) is being selected by the gearshift switch 52 (steps S10 to S40, respectively). If the first gear is being selected, first-gear shift control shown in FIG. 8 is conducted (the process is skipped from step S10 to S50). If the second gear is being selected, second-gear shift control shown in FIG. 9 is conducted (the process is skipped from step S20 to S60). If the third gear is being selected, third-gear shift control shown in FIG. 10 is conducted (the process is skipped from step S30 to S70). If the fourth gear is being selected, fourth-gear shift control shown in FIG. 11 is conducted (the process is skipped from step S40 to S80). If it is judged that none of the first to fourth gears is being selected, error processing is conducted (the process is skipped from step S40 to S90). The second-gear shift control process, for example, forcibly occurs during error processing.

Figure 7:
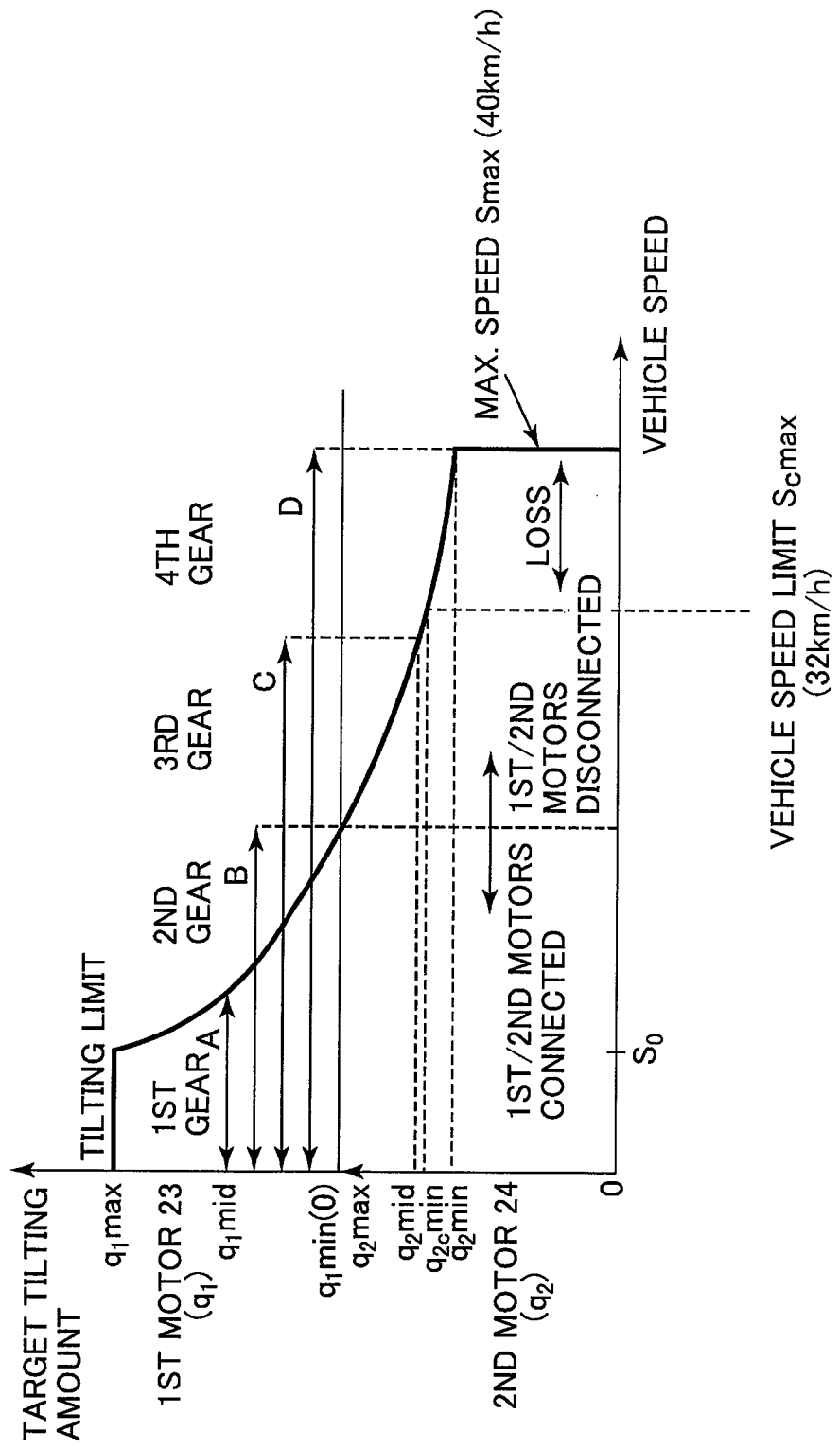
FIG. 7 is a diagram that represents vehicle speed-target tilting amount relationships (target tilt characteristics) stored within the HST control unit, these relationships being used to compute target tilting amounts of first and second hydraulic motors.

FIG. 7 is a diagram that represent vehicle speed-target tilting amount relationships used to compute target tilting amounts of the first and second hydraulic motors 23, 24 during the shift control processes for the first to fourth gears (hereinafter, this relationship is referred to as the target tilt characteristics as appropriate). In FIG. 7, the relationship between the vehicle speed and the target tilting amount is set as follows:

When the vehicle speed is equal to or less than a required value S0, the target tilting amounts q1, q2 of the first and second hydraulic motors 23, 24 take respective maximum values q1max, q2max, both of which are constant.

When the vehicle speed exceeds the required value S0, the target tilting amount q1 of the first hydraulic motor 23 progressively decreases as the vehicle speed increases. At this time, the target tilting amount q2 of the second hydraulic motor 24 remains constant at the maximum quantity q2max. When the vehicle speed further increases and the target tilting amount q1 of the first hydraulic motor 23 reaches a minimum tilting amount q1min (0), the target tilting amount q1 of the first hydraulic motor 23 is maintained at the minimum tilting amount q1min for any subsequent increases in vehicle speed, and the target tilting amount q2 of the second hydraulic motor 24 progressively decreases from the maximum tilting amount q2max with each increase in vehicle speed.

During the first-gear shift control process, the target tilting amounts q1, q2 of the first and second hydraulic motors 23, 24 are computed in a range of arrow A in FIG. 7, and during the second-gear shift control process, the target tilting amounts q1, q2 of the first and second hydraulic motors 23, 24 are computed in a range of arrow B in FIG. 7. Similarly, during the third-gear shift control process, the target tilting amounts q1, q2 of the first and second hydraulic motors 23, 24 are computed in a range of arrow C in FIG. 7, and during the fourth-gear shift control process, the target tilting amounts q1, q2 of the first and second hydraulic motors 23, 24 are computed in a range of arrow D in FIG. 7.

In the present embodiment, the vehicle speed limit Scmax is set to stay within a characteristic vehicle speed range of the fourth-gear selection. For example, if a maximum vehicle speed Smax of the traveling system is 40 km/h, the vehicle speed limit Scmax is 32 km/h, for example.

In addition, when the target tilting amount q1 of the first hydraulic motor 23 reaches the minimum tilting amount q1min (0), the first clutch 30 is disengaged and the first hydraulic motor 23 and the second hydraulic motor 24 are disconnected from each other.

FIG. 8 is a flowchart that shows details of the first-gear shift control process, FIG. 9 is a flowchart that shows details of the second-gear shift control process, FIG. 10 is a flowchart that shows details of the third-gear shift control process, and FIG. 11 is a flowchart that shows details of the fourth-gear shift control process.

(First-Gear Shift Control Process)

During the first-gear shift control process, as shown in FIG. 8, firstly the target tilting amount q1 of the first hydraulic motor 23 that corresponds to the vehicle speed computed by the vehicle speed computing section 56c is calculated with reference to the target tilt characteristics of FIG. 7 (step S510). Next, whether the target tilting amount q1 reaches a middle tilting amount q1mid preset as a minimum control value of the first-gear shift is judged (step S515). If the middle tilting amount q1mid is not reached (q1>q1mid), a control current value I1 of the solenoid proportional valve 27 that corresponds to the target tilting amount q1 is calculated (step S520). If the middle tilting amount q1mid is reached (q1=q1mid), the control current value I1 of the solenoid proportional valve 27 that corresponds to the middle tilting amount q1mid is calculated (step S525). Next, a control signal corresponding to the current value I1 is output to the solenoid proportional valve 27, and a control signal of a previously calculated current value I2 (Imax) corresponding to the maximum tilting amount q2max of the second hydraulic motor 24 is output to the solenoid proportional valve 28 (step S530).

(Second-Gear Shift Control Process)

As shown in FIG. 9, essentially the same as that of the first-gear shift control process occurs during the second-gear shift control process as well. That is to say, the target tilting amount q1 of the first hydraulic motor 23 that corresponds to the vehicle speed computed by the vehicle speed computing section 56c is calculated with reference to the target tilt characteristics of FIG. 7 (step S610). Next, whether the target tilting amount q1 reaches a preassigned minimum tilting amount of q1min of the first hydraulic motor 23 is judged (step 615). If the minimum tilting amount q1min is not reached (q1>q1mid), the control current value I1 of the solenoid proportional valve 27 that corresponds to the target tilting amount q1 is calculated (step S620). If the minimum tilting amount q1min is reached (q1=q1min), the control current value I1 of the solenoid proportional valve 27 that corresponds to the minimum tilting amount q1min is calculated (step S625). Next, the control signal corresponding to the current value I1 is output to the solenoid proportional valve 27 and the control signal of the previously calculated current value I2 (Imax) corresponding to the maximum tilting amount q2max of the second hydraulic motor 24 is output to the solenoid proportional valve 28 (step S630).

(Third-Gear Shift Control Process)

During the third-gear shift control process, as shown in FIG. 10, firstly the target tilting amount q1 of the first hydraulic motor 23 that corresponds to the vehicle speed computed by the vehicle speed computing section 56c is calculated with reference to the target tilt characteristics of FIG. 7 (step S710). Next, whether the target tilting amount q1 reaches the preassigned minimum tilting amount q1min of the first hydraulic motor 23 is judged (step S715). If the minimum tilting amount q1min is not reached, the control current value I1 of the solenoid proportional valve 27 that corresponds to the target tilting amount q1 is calculated (step S720) and the control signal corresponding to the current value I1 is output to the solenoid proportional valve 27. Additionally, the control signal of the previously calculated current value I2 (Imax) corresponding to the maximum tilting amount q2max of the second hydraulic motor 24 is output to the solenoid proportional valve 28 (step S730).

If, in step S715, the target tilting amount q1 reaches the minimum tilting amount q1min (q1=q1min), the target tilting amount q2 of the second hydraulic motor 24 that corresponds to the vehicle speed computed by the vehicle speed computing section 56c is calculated with reference to the target tilt characteristics of FIG. 7 (step S750). Next, whether the target tilting amount q2 equals or exceeds a middle tilting amount q2mid preset as a minimum control value of the third-gear shift is judged (step S755). If the middle tilting amount q2mid is not reached (q2>q2mid), the control current value I2 of the solenoid proportional valve 28 that corresponds to the target tilting amount q2 is calculated (step S760). If the middle tilting amount q2mid is reached (q2=q2mid), the control current value I2 of the solenoid proportional valve 28 that corresponds to the target tilting amount q2mid is calculated (step S765). Next, a clutch OFF control signal is output to the solenoid selector valve 42 of the first clutch 30 to disconnect the first hydraulic motor 23 and the second hydraulic motor 24 from each other (step S770). Additionally, the control signal of the previously calculated current value I1 (Imin) corresponding to the minimum tilting amount q1min of the first hydraulic motor 23 is output to the solenoid proportional valve 27 and the control signal of the current value I2 is output to the solenoid proportional valve 28 (step S780).

(Fourth-Gear Shift Control Process)

Steps S810 to S850 of the fourth-gear shift control process are, as shown in FIG. 11, essentially the same as steps S710 to S750 of the third-gear shift control process shown in FIG. 9. Firstly, the target tilting amount q2 of the second hydraulic motor 24 that corresponds to the vehicle speed computed by the vehicle speed computing section 56c is calculated with reference to the target tilt characteristics of FIG. 7, in step S850. Next, whether the target tilting amount q2 equals or exceeds the tilting amount limit q2cmin of the second hydraulic motor 24 that was computed in step S4 of FIG. 6 (q2cmin is more than the minimum tilting amount q2min of the second hydraulic motor 24) is judged (step S855). If the tilting amount limit q2cmin is not reached (q2>q2cmin), the control current value I2 of the solenoid proportional valve 28 that corresponds to the target tilting amount q2 is calculated (step S860). If the tilting amount limit q2cmin is reached (q2=q2cmin), the control current value I2 of the solenoid proportional valve 28 that corresponds to the tilting amount limit q2cmin is calculated (step S865). Next, the clutch OFF control signal is output to the solenoid selector valve 42 of the first clutch 30 to disconnect the first hydraulic motor 23 and the second hydraulic motor 24 from each other (step S870). Additionally, the control signal of the previously calculated current value I1 (I1min) corresponding to the minimum tilting amount q1min of the first hydraulic motor 23 is output to the solenoid proportional valve 27 and the control signal of the current value I2 is output to the solenoid proportional valve 28 (step S880).

The tilting amount limit q2cmin here is the tilting amount at which the vehicle speed limit Scmax is obtained when the engine speed of the engine 10 is equal to the first engine speed limit Ncmax1 (e.g., 1,800 rpm) described later herein.

As set forth above, the tilting amounts of the first and second hydraulic motors 23, 24 are controlled as follows by the computing process of the motor control section 561a in the HST control unit 56h.

During the first-gear shift control process, as the vehicle speed increases in the range of arrow A in FIG. 7, the target tilting amount q1 of the first hydraulic motor 23 decreases from the maximum tilt q1max to the middle tilting amount q1mid. Also, the target tilting amount q2 of the second hydraulic motor 24 is fixed at the maximum tilting amount q2max. Consequently, as the vehicle speed increases, the tilting amount of the first hydraulic motor 23 decreases to the middle tilting amount q1mid with the target tilting amount q2 of the second hydraulic motor 24 remaining fixed at the maximum tilting amount q2max. As the tilting amount of the first hydraulic motor 23 thus decreases, a rotational speed thereof rises and the vehicle speed increases.

During the second-gear shift control process, as the vehicle speed increases in the range of arrow B in FIG. 7, the target tilting amount q1 of the first hydraulic motor 23 decreases from the maximum tilt q1max to the minimum tilting amount q1min. Also, the target tilting amount q2 of the second hydraulic motor 24 is fixed at the maximum tilting amount q2max. Consequently, as the vehicle speed increases, the tilting amount of the first hydraulic motor 23 decreases to the minimum tilting amount q1min with the target tilting amount q2 of the second hydraulic motor 24 remaining fixed at the maximum tilting amount q2max. As the tilting amount of the first hydraulic motor 23 thus decreases, the rotational speed thereof rises and the vehicle speed increases.

During the third-gear shift control process, essentially the same control as that of the second-gear shift control process is conducted when the vehicle speed lies in the second-gear speed range of arrow B in FIG. 7. When the target tilting amount q1 of the first hydraulic motor 23 reaches the minimum tilting amount q1min, the first clutch 30 is disengaged and the connection between the first hydraulic motor 23 and the second hydraulic motor 24 is released. Also, as the vehicle speed increases in the third-gear speed range of arrow C in FIG. 7, the target tilting amount q2 of the second hydraulic motor 24 decreases from the maximum tilting amount q2max to the middle tilting amount q2mid. In addition, the target tilting amount q1 of the first hydraulic motor 23 is fixed at the minimum tilting amount q1min. Consequently, until the target tilting amount q1 of the first hydraulic motor 23 has reached the minimum tilting amount q1min, the tilting amount of the first hydraulic motor 23 decreases, as with that of the second-gear shift control process. As the tilting amount of the first hydraulic motor 23 decreases, the rotational speeds of the first and second hydraulic motors 23, 24 rise and the vehicle speed increases. After the target tilting amount q1 of the first hydraulic motor 23 has reached the minimum tilting amount q1min, as the vehicle increases, the tilting amount of the second hydraulic motor 24 decreases to the middle tilting amount q2mid with the tilting amount of the first hydraulic motor 23 remaining fixed at the minimum tilting amount q1min and with the connection between the first hydraulic motor 23 and the second hydraulic motor 24 remaining released. Thus, as the tilting amount of the second hydraulic motor 24 decreases, the rotational speed only of the second hydraulic motor 24 rises and the vehicle speed further increases. At this time, since the connection between the first hydraulic motor 23 and the second hydraulic motor 24 remains released, the second hydraulic motor 24 can increase the vehicle speed efficiently without undergoing any resistance of the first hydraulic motor 23.

During the fourth-gear shift control process, essentially the same control as that of the second-gear shift control process is also conducted when the vehicle speed lies in the second-gear speed range of arrow B in FIG. 7. When the target tilting amount q1 of the first hydraulic motor 23 reaches the minimum tilting amount q1min, the first clutch 30 is disengaged and the connection between the first hydraulic motor 23 and the second hydraulic motor 24 is released. Also, as the vehicle speed increases in the third-gear speed range of arrow D in FIG. 7, the target tilting amount q2 of the second hydraulic motor 24 decreases from the maximum tilting amount q2max to the tilting amount limit q2cmin. In addition, the target tilting amount q1 of the first hydraulic motor 23 is fixed at the minimum tilting amount q1min. Consequently, until the target tilting amount q1 of the first hydraulic motor 23 has reached the minimum tilting amount q1min, the tilting amount of the first hydraulic motor 23 decreases, as with that of the second-gear shift control process. As the tilting amount of the first hydraulic motor 23 thus decreases, the rotational speeds of the first and second hydraulic motors 23, 24 rise and the vehicle speed increases. After the target tilting amount q1 of the first hydraulic motor 23 has reached the minimum tilting amount q1min, as the vehicle speed increases, the tilting amount of the second hydraulic motor 24 decreases with the tilting amount of the first hydraulic motor 23 remaining fixed at the minimum tilting amount q1min and with the connection between the first hydraulic motor 23 and the second hydraulic motor 24 remaining released. If the vehicle speed limit Scmax is not set to stay within the fourth-gear vehicle speed range, the tilting amount of the second hydraulic motor 24 decreases to the minimum tilting amount q2min. In the present embodiment, however, since the vehicle speed limit Scmax is set to stay within the fourth-gear vehicle speed range and since the tilting amount limit q2cmin is set according to the particular setting of the vehicle speed limit Scmax, once the tilting amount of the second hydraulic motor 24 has decreased to the tilting amount limit q2cmin, the tilting amount of the second hydraulic motor 24 is fixed at the tilting amount limit q2cmin and does not decrease any further. Thus, while the tilting amount of the second hydraulic motor 24 decreases, the rotational speed only of the second hydraulic motor 24 rises according to the particular decrease in the tilting amount thereof, and thus the vehicle speed further increases. At this time, since the connection between the first hydraulic motor 23 and the second hydraulic motor 24 remains released, the second hydraulic motor 24 can increase the vehicle speed efficiently without undergoing any resistance of the first hydraulic motor 23.

Figure 12:
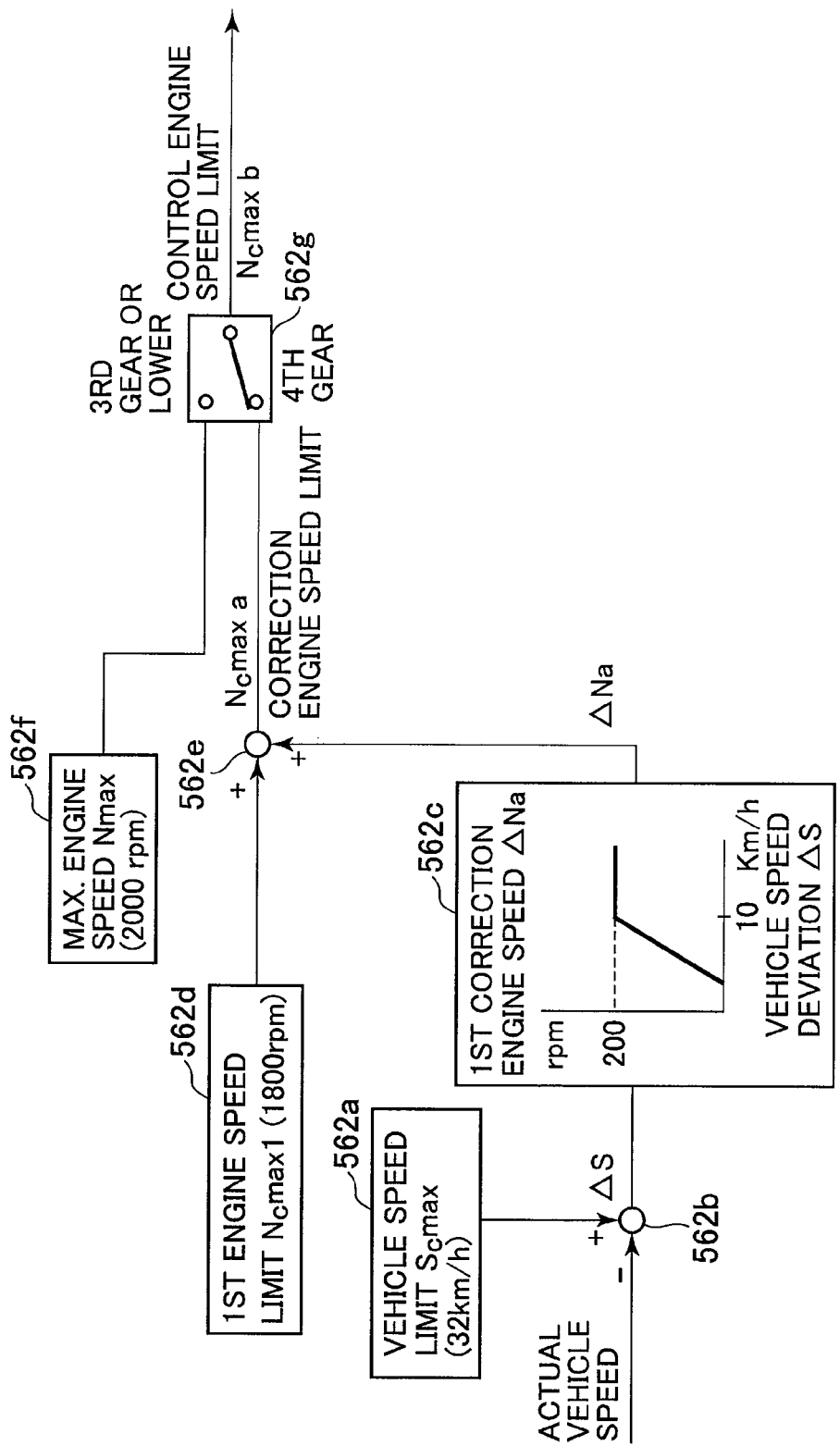
FIG. 12 is a diagram that shows details of processing in an engine speed limit computing section of the HST control unit, shown in FIG. 5.

FIG. 12 is a diagram that shows details of the process in the engine speed limit computing section 562, shown in FIG. 5.

Referring to FIG. 12, the engine speed limit computing section 562 has functions of a vehicle speed limit acquiring section 562a, a vehicle speed deviation computing section 562b, a first correction engine speed computing section 562c, a first engine speed limit acquiring section 562d, an engine speed limit correcting section 562e, a maximum engine speed acquiring section 562f, and a first switching section 562g.

The vehicle speed limit acquiring section 562a reads out the vehicle speed limit Scmax (e.g., 32 km/h) stored within the parameter storage unit 56g, and the vehicle speed deviation computing section 562b computes a vehicle speed deviation $\Delta S$ by subtracting, from the vehicle speed limit Scmax that has been read out above, the vehicle speed computed by the vehicle speed computing section 56c (this vehicle speed is hereinafter referred to as the actual vehicle speed).

The first correction engine speed computing section 562c computes a first correction engine speed $\Delta Na$ with reference to the vehicle speed deviation $\Delta S$ in a memory-stored table. A relationship between the vehicle speed deviation $\Delta S$ and the first correction engine speed $\Delta Na$ is set in the memory table to ensure that: for example, when the vehicle speed deviation $\Delta S$ is equal to or greater than a preset limitation-starting vehicle speed deviation (e.g., 10 km/h), the first correction engine speed $\Delta Na$ takes a maximum value $\Delta Nmax1$ (e.g., 200 rpm); when the vehicle speed deviation $\Delta S$ decreases below the preset limitation-starting vehicle speed deviation (e.g., 10 km/h), the first correction engine speed $\Delta Na$ goes down as the vehicle speed $\Delta S$ decreases; and when the vehicle speed $\Delta S$ decreases below a required value close to 0, the first correction engine speed $\Delta Na$ becomes 0.

The first engine speed limit acquiring section 562d reads out the first engine speed limit Ncmax1 stored within the parameter storage unit 56g, and the engine speed limit correcting section 562e calculates a correction engine speed limit Ncmaxa (=Ncmax1+$\Delta Na$) by adding to the first engine speed limit Ncmax1 the first correction engine speed $\Delta Na$ computed by the first correction engine speed computing section 562c. If the maximum rated engine speed of the engine 10 is 2,000 rpm, the first engine speed limit Ncmax1 is 1,800 rpm, for example. The maximum value $\Delta Nmax1$ (e.g., 200 rpm) of the correction engine speed $\Delta Na$ that is set in the first correction engine speed computing section 562c is preferably a value at which a value obtained by adding $\Delta Nmax1$ to the first engine speed limit Ncmax1 (e.g., 1,800 rpm) equals the maximum rated engine speed Nmax of the engine 10 (e.g., 2,000 rpm).

The maximum engine speed acquiring section 562f reads out the maximum rated engine speed Nmax (e.g., 2,000 rpm) of the engine 10 stored within the parameter storage unit 56g.

If the discrimination results by the gearshift switch state discriminator 56e indicate the third gear or lower, the first switching section 562g selects the maximum rated engine speed Nmax that the maximum engine speed acquiring section 562f has read out, and then outputs the selected maximum rated engine speed Nmax as a control engine speed limit Ncmaxb. If the discrimination results by the gearshift switch state discriminator 56e indicate the fourth gear, the first switching section 562g selects the correction engine speed limit Ncmaxa that the maximum engine speed acquiring section 562f has computed, and then outputs the selected correction engine speed limit Ncmaxa as the control engine speed limit Ncmaxb. The control engine speed limit Ncmaxb thus output from the first switching section 562g is transmitted to the engine controller 57 via the communication line 58, as described above.

Figure 13:
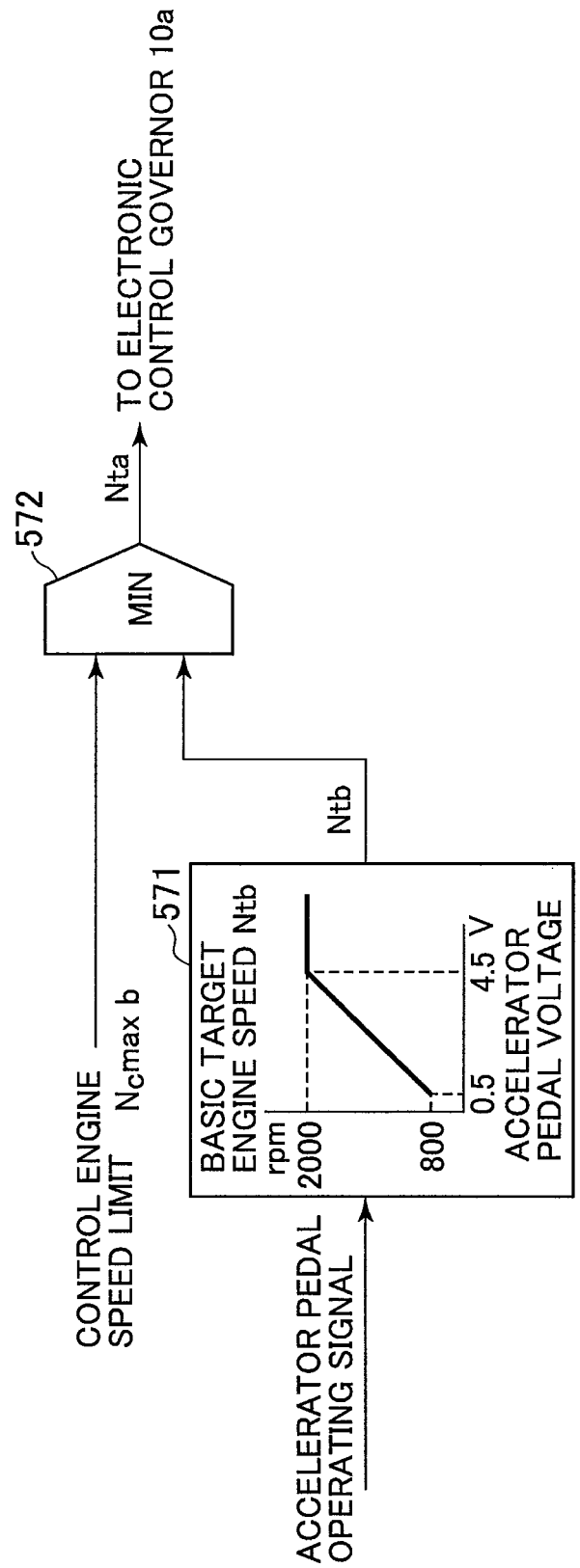
FIG. 13 is a diagram that shows details of processing in an engine control unit of the engine controller.

FIG. 13 is a diagram that shows details of processing in the engine control unit 57a of the engine controller 57.

The engine control unit 57a includes a basic target engine speed computing section 571 and a target engine speed determining section 572.

The basic target engine speed computing section 571 receives the operating signal as an input signal from the accelerator pedal 50, and computing a basic target engine speed Ntb of the engine 10 by checking an associated voltage (accelerator pedal voltage) against the memory-stored table. A relationship between the accelerator pedal voltage and the basic target engine speed Ntb is set in the memory table to ensure that: for example, when the accelerator pedal voltage is equal to or less than 0.5 V, the basic target engine speed Ntb means a low idling speed 8 (e.g., 800 rpm); when the accelerator pedal voltage exceeds 0.5 V, the basic target engine speed Ntb increases with each increase in the accelerator pedal voltage; and when the accelerator pedal voltage equals or exceeds 4.5 V, the basic target engine speed Ntb means the maximum rated engine speed (e.g., 2,000 rpm).

The target engine speed determining section 572 is a minimal-value selector, which selects the control engine speed limit Ncmaxb or the basic target engine speed Ntb, whichever is the smaller, as a control target engine speed Nta. The Ncmaxb and Ntb here are the values that were computed by the engine speed limit computing section 562 of the HST control unit 56h, and the basic target engine speed computing section 571, respectively. The control target engine speed Nta is next output as a command signal to the electronic control governor 10a.

In the system configuration described above, the HST output shaft speed sensor 55, the HST output shaft speed computing section 56b, and the vehicle speed computing section 56c constitute a vehicle speed detection element, and the gearshift switch 52 constitutes a gear selector element.

Also, the motor control section 561a in the traveling control section 561 of the HST control unit 56h constitutes a motor control element adapted to control the capacities of the hydraulic motors 23, 24 according to an actual vehicle speed detected by the vehicle speed detection element. The motor control element is further adapted so that during the selection of either the highest gear (fourth gear) or the next highest gear (third gear), as a required gear, by the gear selector element (gearshift switch 52), when the actual vehicle speed reaches the preassigned vehicle speed limit Scmax, the motor control element limits a minimum capacity of the second hydraulic motor 24 to the preassigned capacity limit (tilting amount limit) q2cmin. The engine speed limit computing section 562 in the traveling control section 561 of the HST control unit 56h, and the HST engine controller 57 constitute an engine control element, which, during the selection of the required gear by the gear selector element (gearshift switch 52), when the actual vehicle speed approaches the vehicle speed limit Scmax, limits the maximum engine speed of the engine 10 to the preassigned first engine speed limit Ncmax1 lower than the maximum rated engine speed.

In addition, the engine speed limit computing section 562 in the traveling control section 561 of the HST control unit 56h and HST engine controller 57 constituting the engine control element computes a control target engine speed which, when the accelerator pedal 50 is indicating a target engine speed higher than a first engine speed limit, is intended to decrease from the target engine speed to the first engine speed limit as the actual vehicle speed approaches the vehicle speed limit, and then outputs the computed control target engine speed to the electronic control governor 10a.

The engine speed limit computing section 562, part of the engine control element, constitutes a first element, which calculates a deviation between the actual vehicle speed and a vehicle speed limit and when this vehicle speed deviation decreases below a required value, computes a control engine speed limit that is intended to decrease from the maximum rated engine speed to the first engine speed limit as the vehicle speed deviation decreases. The HST engine controller 57 constitutes a second element that outputs the control engine speed limit as the control target engine speed when the target engine speed that the accelerator pedal 50 indicates is higher than the control engine speed limit.

Furthermore, the motor control section 561a that is a motor control element in the traveling control section 561 of the HST control unit 56h controls the capacities of the first and second hydraulic motors 23, 24 so that when the gear selector element is selecting the required gear, as the actual vehicle speed detected by the vehicle speed detection element increases, the capacity of the first hydraulic motor 23 progressively decreases and that of the second hydraulic motor 24 becomes fixed at a maximum capacity. The motor control section 561a is also adapted so that when the capacity of the first hydraulic motor 23 reaches a minimum capacity, the capacity of the second hydraulic motor 24 progressively decreases and that of the first hydraulic motor 23 becomes fixed at the minimum capacity. The motor control section 561a further conducts control to prevent the capacity of the second hydraulic motor 24 from exceeding the capacity limit (tilting amount limit) q2cmin when the actual vehicle speed reaches the vehicle speed limit.

Next, operation of the present embodiment having the above configuration is described below.
(Start of Traveling)

When an operator operates the forward/reverse traveling selector switch 51 to a forward traveling position with an intention to make the vehicle travel and fully steps on the accelerator pedal 50, the accelerator pedal 50 has its operating signal input to the engine control unit 57a of the engine controller 57. The basic target engine speed computing section 571 of the engine control unit 57a in FIG. 13 then computes the basic target engine speed Ntb that changes from the low idling speed (e.g., 800 rpm) to the maximum rated engine speed (e.g., 2,000 rpm).

Meanwhile, if, at this time, the gearshift switch 52 is selecting either the first, second, or third gear, the maximum rated engine speed (e.g., 2,000 rpm) that has been loaded into the maximum engine speed acquiring section 562f is selected by the first switching section 562g of the engine speed limit computing section 562 in FIG. 12, and then the maximum rated engine speed is input as the control engine speed limit Ncmaxb to the target engine speed determining section 572 shown in FIG. 13. If the gearshift switch 52 is selecting the fourth gear, the correction engine speed limit Ncmaxa computed by the engine speed limit correcting section 562e is selected by the first switching section 562g of the engine speed limit computing section 562 in FIG. 12, but since the vehicle speed deviation ΔS during the start of traveling is great, the correction engine speed limit Ncmaxa equal to Ncmax1 (e.g., 1,800 rpm)+ΔNmax1 (e.g., 200 rpm) is computed in the engine speed limit correcting section 562e. In this case, the maximum rated engine speed (e.g., 2,000 rpm) is also input as the control engine speed limit Ncmaxb to the target engine speed determining section 572 shown in FIG. 13.

As a result, the basic target engine speed Ntb that has been computed by the basic target engine speed computing section 571 is selected as the control target engine speed Nta by the target engine speed determining section 572 of FIG. 13, then the control target engine speed Nta that increases according to the amount of stepping-on of the accelerator pedal 50 is input to the electronic control governor 10a of the engine 10, and the engine speed increases from the low idling speed (e.g., 800 rpm) to the maximum rated engine speed (e.g., 2,000 rpm), depending upon the amount of stepping-on of the accelerator pedal 50.

The increase in the speed of the engine 10 increases a discharge amount of the hydraulic pump 20 in the closed-circuit hydraulic drive system 11 shown in FIG. 3, thus causing the first and second hydraulic motors 23, 24 to start rotating according to the particular increase in the discharge amount of the pump, and transmitting the rotational movements to the front wheel 111 and the rear wheel 112 via the propeller shaft 14. The vehicle body thus starts to travel.

During the start of traveling, the first and second hydraulic motors 23, 24 are both in a maximum tilting condition (see FIG. 7), which allows low-speed high-torque traveling. Thus, the wheel loader starts with high accelerating performance.

Also, as the traveling speed of the vehicle body (i.e., the vehicle speed) increases, execution of either of the first-gear to fourth-gear shift control processes in the flowcharts of FIGS. 8 to 11, depending upon the gear selected by the gearshift switch 52, reduces the tilting amount of the first hydraulic motor 23 (in a case of the first-gear and second-gear shift control processes) or the tilting amounts of the first and second hydraulic motors 23, 24 (in a case of the third-gear and fourth-gear shift control processes). The particular decreases in the tilting amounts of the first and second hydraulic motors 23, 24 further raises the engine speed, thus further increasing the vehicle speed.

In this way, during the start of traveling, when the accelerator pedal is fully stepped on, the engine speed rapidly increases to the maximum rated engine speed (e.g., 2,000 rpm) without being limited by the first engine speed limit, and as the vehicle speed increases, the tilting amounts of the first and second hydraulic motors 23, 24 decrease. High accelerating performance can thus be obtained.

In addition, during the selection of the third gear or the fourth gear, when the target tilting amount q1 of the first hydraulic motor 23 reaches the minimum tilting amount q1min, the connection between the first hydraulic motor 23 and the second hydraulic motor 24 is released, which makes the second hydraulic motor 24 increase in speed without undergoing any resistance of the first hydraulic motor 23 and hence allows the vehicle speed to be increased efficiently.

Furthermore, during the selection of the third gear or the fourth gear, the capacities of the first and second hydraulic motors 23, 24 are controlled in coordinative fashion so that until the target tilting amount q1 of the first hydraulic motor 23 has reached the minimum tilting amount q1min, the tilting amount of the first hydraulic motor 23 decreases with the tilting amount of the second hydraulic motor 24 remaining fixed at the maximum tilting amount q2max. Additionally, after the target tilting amount q1 of the first hydraulic motor 23 has reached the minimum tilting amount q1min, the tilting amount of the second hydraulic motor 24 is reduced with the tilting amount of the first hydraulic motor 23 remaining fixed at the minimum tilting amount q1min. Such control allows efficient, smooth vehicle speed control.

(High-Speed Traveling)

During the selection of the fourth gear, the target tilting amount q2 of the second hydraulic motor 24 is computed by the execution of the fourth-gear shift control process in FIG. 11, and when the vehicle speed reaches the vehicle speed limit Scmax and the target tilting amount q2 reaches the tilting amount limit q2cmin, the target tilting amount q2 does not decrease any further and the minimum tilting amount of the second hydraulic motor 24 is limited to the tilting amount limit q2cmin.

Meanwhile, during the selection of the fourth gear, the correction engine speed limit Ncmaxa is selected by the first switching section 562g in the engine speed limit computing section 562 of FIG. 12, and this correction engine speed limit Ncmaxa is input as the control engine speed limit Ncmaxb to the target engine speed determining section 572 shown in FIG. 13.

During the selection of the fourth gear, when the vehicle speed approaches the vehicle speed limit Scmax and the vehicle speed deviation ΔS becomes smaller than the limitation-starting vehicle speed deviation (e.g., 10 km/h), the first correction engine speed ΔNa that decreases with the decrease in ΔS is computed and the correction engine speed limit Ncmaxa (=Ncmax1 (e.g., 1,800 rpm)+ΔNa (e.g., 0-200 rpm)), computed by the engine speed limit correcting section 562e, also decreases with a decrease in vehicle speed ΔS. Consequently, when the vehicle speed ΔS decreases below the required value close to 0, the first correction engine speed ΔNa becomes 0 and the correction engine speed limit Ncmaxa becomes equal to the first engine speed limit Ncmax1 (e.g., 1,800 rpm).

As a result, if the accelerator pedal 50 is fully stepped on, the control engine speed limit Ncmaxb (correction engine speed limit Ncmaxa) is selected as the control target engine speed Nta by the target engine speed determining section 572 in FIG. 13, and the selected control engine speed limit Ncmaxb is input to the electronic control governor 10a of the engine 10. Thus, the engine speed of the engine 10 decreases according to a particular decrease in control engine speed limit Ncmaxb, and when the control engine speed limit Ncmaxb decreases to the first engine speed limit Ncmax1 (e.g., 1,800 rpm), the engine speed of the engine 10 is maintained at that speed limit value. Briefly, as the vehicle speed approaches the vehicle speed limit Scmax, the engine speed of the engine 10 progressively decreases from the maximum rated engine speed (e.g., 2,000 rpm) to the first engine speed limit Ncmax1 (e.g., 1,800 rpm), and when the vehicle speed reaches the vehicle speed limit Scmax, the maximum engine speed of the engine 10 is limited to the first engine speed limit Ncmax1 (e.g., 1,800 rpm).

In this manner, the minimum tilting amount of the second hydraulic motor 24 is limited to the tilting amount limit q2cmin and the maximum engine speed of the engine 10 is limited to the first engine speed limit Ncmax1 (e.g., 1,800 rpm), with the result that the maximum traveling vehicle speed of the wheel loader becoming accurately and reliably limitable to the vehicle speed limit Scmax.

In addition, even when the operator fully steps on the accelerator pedal 50, since the maximum engine speed of the engine 10 is limited to the first engine speed limit Ncmax1 (e.g., 1,800 rpm) upon the arrival of the vehicle speed at the vehicle speed limit Scmax, any loss of engine output horsepower during the limited state of the maximum traveling speed can be suppressed and fuel efficiency improved.

(Operation in Work Mode)

Operation in work mode usually uses any one of the first to third gears as a trifle low gear. In this case, the maximum rated engine speed (e.g., 2,000 rpm) is selected by the first switching section 562g of the engine speed limit computing section 562 in FIG. 12 as described above, so the maximum engine speed of the engine 10 is not limited to the first engine speed limit Ncmax1 (e.g., 1,800 rpm). Even if the fourth gear is selected, the traveling speed during work mode is low and the actual vehicle speed is usually far off from the vehicle speed limit. In this case, therefore, the maximum engine speed of the engine 10 is not limited by the vehicle speed limit, either. This means that when the accelerator pedal 50 is fully stepped on, the engine speed rises to the maximum rated engine speed and working efficiency does not decrease.

As set forth above, according to the present embodiment, the maximum traveling speed can be limited without decreases in the working efficiency of the vehicle during work mode or in the accelerating performance of the vehicle during the start of traveling, and any loss of engine output horsepower at the limited maximum traveling speed can be suppressed and fuel efficiency improved.

In addition, efficient, smooth vehicle speed control is possible since the capacities of the first and second hydraulic motors 23, 24 are controlled in coordinative fashion.

A second embodiment of the present invention is described below using FIGS. 14 to 16. In the present embodiment, different engine speed limits are provided so that when the vehicle speed limit Scmax is set to stay within the vehicle speed range of the third gear (third speed range), the engine performance obtained when the particular vehicle speed limit is reached will differ between the selection of the third gear and the selection of the fourth gear (fourth speed range) by the gearshift switch 52.

Figure 14:
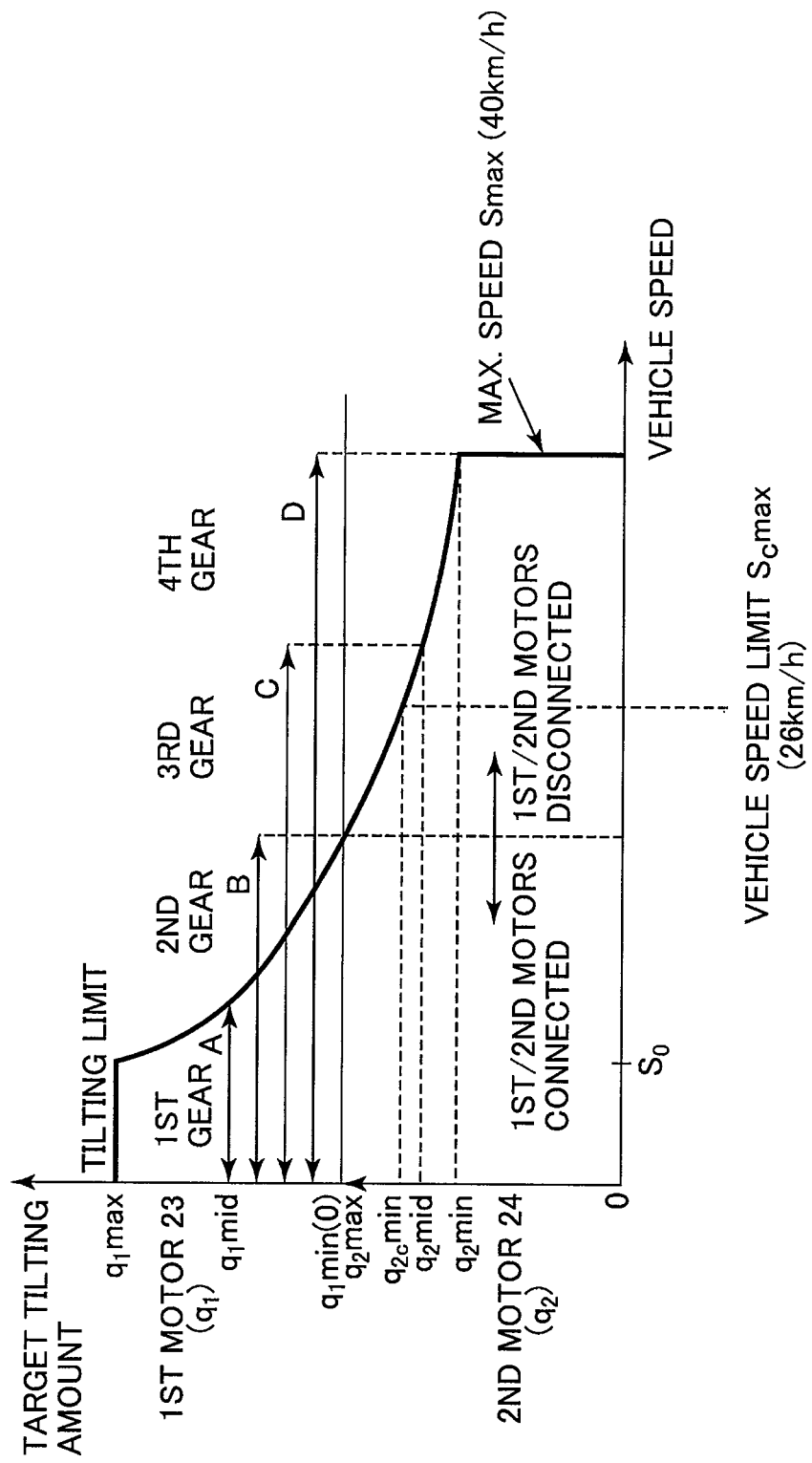
FIG. 14 is a diagram that represents the target tilt characteristics of the first and second hydraulic motors in a second embodiment of the present invention, the diagram being substantially the same as that of FIG. 7.

FIG. 14 is a diagram that represents the vehicle speed-target tilting amount relationships (target tilt characteristics) used to compute target tilting amounts of first and second hydraulic motors 23, 24 (see FIGS. 2 and 3) in the present embodiment, the target tilt characteristics being set to be substantially the same as those of the first embodiment, shown in FIG. 7. In the present (second) embodiment, however, the vehicle speed limit Scmax is set to stay within the vehicle speed range of the third gear (third speed range). The vehicle speed limit Scmax is 26 km/h, for example.

Figure 15:
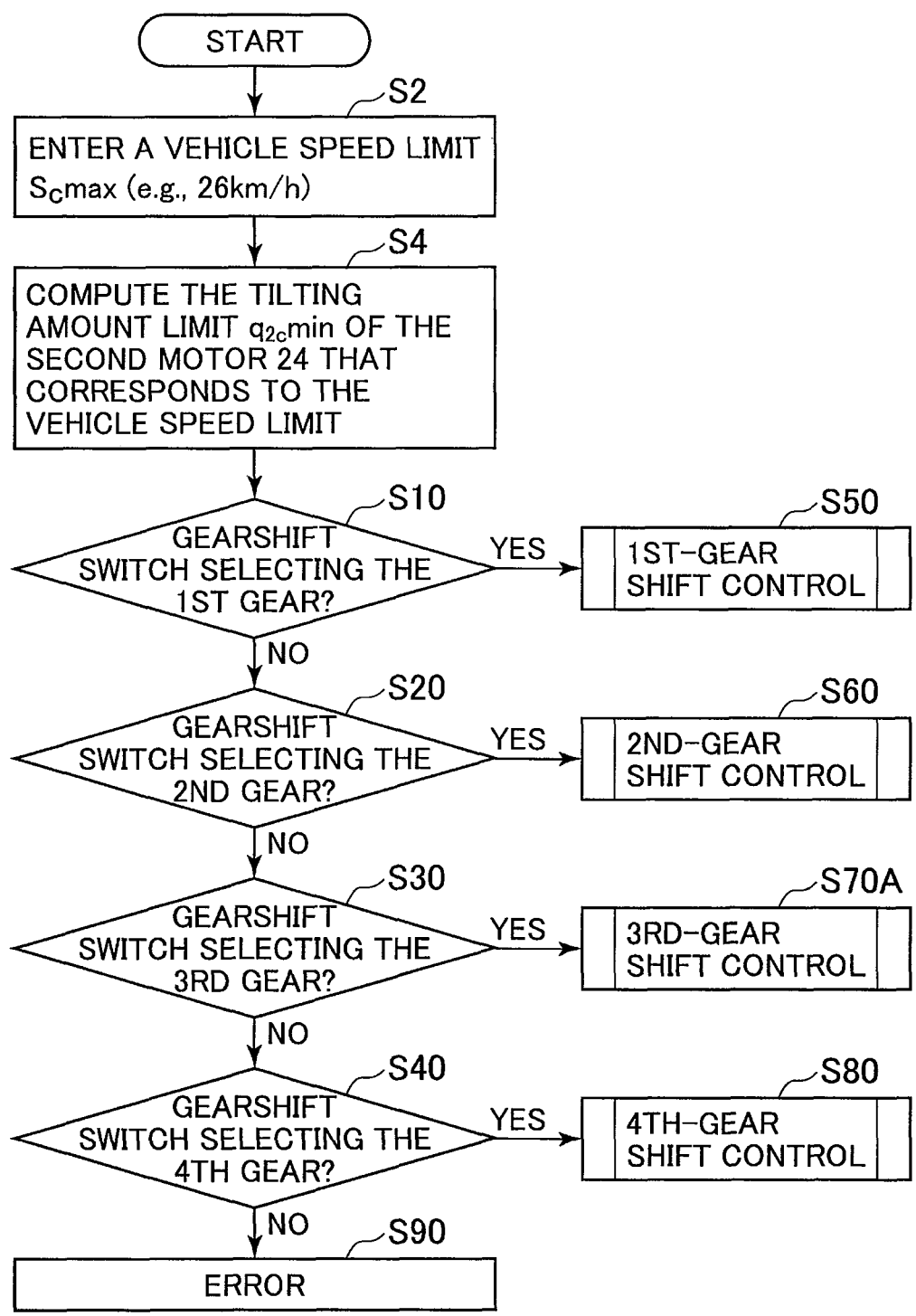
FIG. 15 is a flowchart relating to the entire computing process in the motor control section of the HST control unit in the second embodiment.

FIG. 15 is a flowchart that shows the entire computing process in the motor control section 561a (see FIG. 5) of the HST control unit 56h in the second embodiment. In step S2, the vehicle speed limit Scmax is read out from the parameter storage unit 56g in essentially the same manner as in the first embodiment, the vehicle speed limit Scmax being a value (e.g., 26 km/h) falling within the vehicle speed range of the third gear (third speed range). In step S4, the tilting amount limit q2cmin of the second hydraulic motor 24 that corresponds to the vehicle speed limit Scmax is calculated with reference to the target tilt characteristics shown in FIG. 14. Process details of steps S50, S60, and S80 relating to the selection of the first gear (first speed range), the second gear (second speed range), and the fourth gear (fourth speed range), by the gearshift switch 52, are the same as those shown in FIGS. 7 and 8 for the first embodiment. Process details of step S70A relating to the selection of the third gear (third speed range), however, differ from those of the first embodiment.

Figure 16:
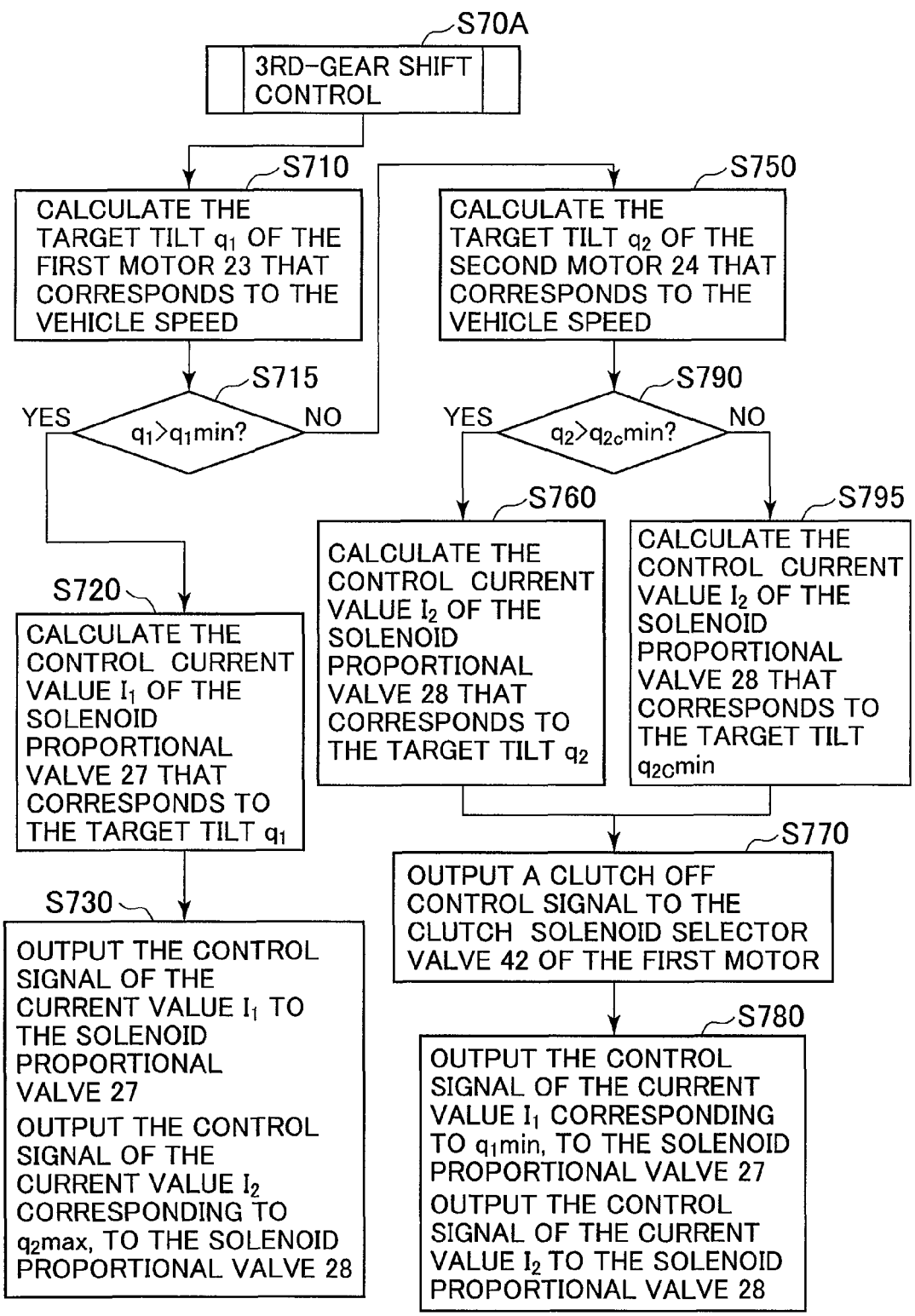
FIG. 16 is a flowchart showing the computing process used when the gearshift switch is selecting the third gear (third speed range)

FIG. 16 is a flowchart showing the computing process conducted when the gearshift switch 52 is selecting the third gear (third speed range). In FIG. 16, sections equivalent to those shown in FIG. 9 are each assigned the same reference number.

Process details of steps S710 to S750 in step S70A of FIG. 16 are the same as those of steps S710 to S750 shown in FIG. 9 for the third-gear shift control process in the first embodiment. After the target tilting amount q2 of the second hydraulic motor 24 that corresponds to the vehicle speed computed by the vehicle speed computing section 56c has been calculated in step S750 with reference to the target tilt characteristics shown in FIG. 14, whether the calculated target tilting amount q2 reaches the tilting amount limit q2cmin of the second hydraulic motor 24, computed in step S4 of FIG. 6, is discriminated in step S790. If the tilting amount limit q2cmin is not reached (q2>q2cmin), the control current value I2 of the solenoid proportional valve 28 that corresponds to the target tilting amount q2 is calculated in step S760. If the tilting amount limit q2cmin is reached (q2=q2cmin), the control current value I2 of the solenoid proportional valve 28 that corresponds to the tilting amount limit q2cmin is calculated in step S795. Next, the clutch OFF control signal is output to the solenoid selector valve 42 of the first clutch 30 in step S770 to release the connection between the first hydraulic motor 23 and the second hydraulic motor 24. Additionally, the control signal of the previously calculated current value I1 (Imin) corresponding to the minimum tilting amount q1min of the first hydraulic motor 23 is output to the solenoid proportional valve 27 and the control signal of the current value I2 is output to the solenoid proportional valve 28 in step S780.

The tilting amount limit q2cmin here is a tilting amount at which the vehicle speed limit Scmax is obtainable when the engine speed of the engine 10 is equal to either the first engine speed limit Ncmax1 (e.g., 1,800 rpm) or a second engine speed limit Ncmax2 (e.g., 1,600 rpm).

Figure 17:
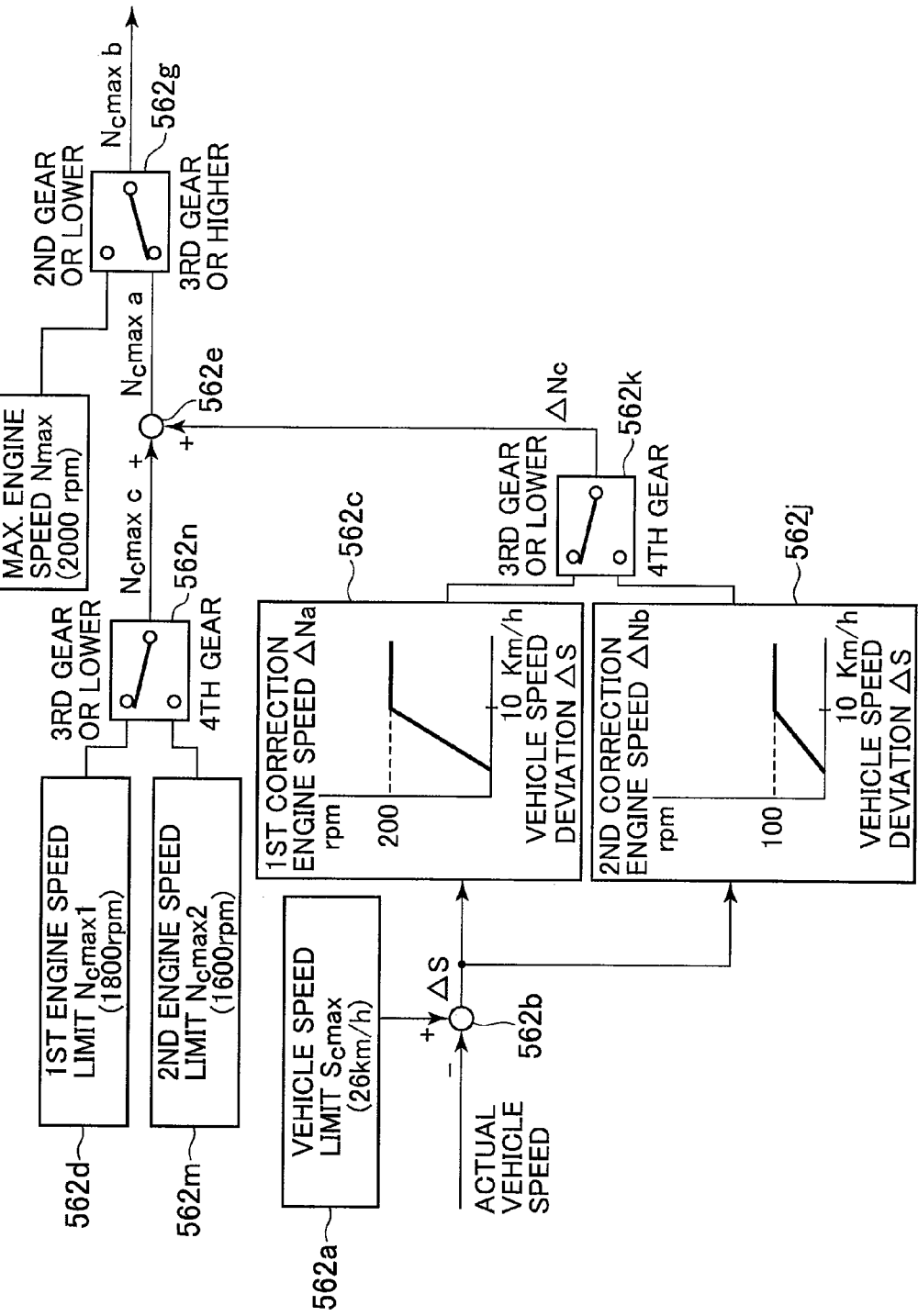
FIG. 17 is a diagram that shows details of processing in the engine speed limit computing section of the HST control unit in the second embodiment.

FIG. 17 is a diagram that shows details of the computing process in the engine speed limit computing section 562 of the HST control unit 56h in the present embodiment. In FIG. 17, sections equivalent to those shown in FIG. 12 are each assigned the same reference number.

In addition to the functions of the vehicle speed limit acquiring section 562a, vehicle speed deviation computing section 562b, first correction engine speed computing section 562c, first engine speed limit acquiring section 562d, engine speed limit correcting section 562e, maximum engine speed acquiring section 562f, and first switching section 562g, the engine speed limit computing section 562 in the present embodiment has functions of a second correction engine speed computing section 562j, a second switching section 562k, a second engine speed limit acquiring section 562m, and a third switching section 562n.

The second correction engine speed computing section 562j computes a second correction engine speed ΔNb with reference to a vehicle speed deviation ΔS in a memory-stored table. A relationship between the vehicle speed deviation ΔS and the second correction engine speed ΔNb is set in the memory table to ensure that: for example, when the vehicle speed deviation ΔS is equal to or greater than a preset limitation-increase-starting vehicle speed deviation (e.g., 10 km/h), the second correction engine speed ΔNb takes a maximum value ΔNmax2 (e.g., 100 rpm); when the vehicle speed deviation ΔS decreases below the preset limitation-increase-starting vehicle speed deviation (e.g., 10 km/h), the second correction engine speed ΔNb goes down as the vehicle speed ΔS decreases; and when the vehicle speed ΔS decreases below a required value close to 0, the second correction engine speed ΔNb becomes 0. The maximum value ΔNmax2 (e.g., 100 rpm) of the second correction engine speed ΔNb is preferably a value smaller than the maximum value ΔNmax1 (e.g., 200 rpm) of the first correction engine speed Na in the first correction engine speed computing section 562c.

If the gear that the gearshift switch state discriminator 56e has discriminated is the third gear or lower, the second switching section 562k selects the first correction engine speed ΔNa that the first correction engine speed computing section 562c has calculated, and outputs the selected speed as a correction engine speed ΔNc. If the gear discriminated by the gearshift switch state discriminator 56e is the fourth gear, the second switching section 562k selects the second correction engine speed ΔNb that the second correction engine speed computing section 562j has calculated, and outputs the selected speed as the correction engine speed ΔNc.

The second engine speed limit acquiring section 562m reads out the second engine speed limit Ncmax2 stored within the parameter storage unit 56g, and then if the gear discriminated by the gearshift switch state discriminator 56e is the third gear or lower, the third switching section 562n selects the first engine speed limit Ncmax1 that the first engine speed limit acquiring section 562d has loaded, and outputs the selected speed Ncmax1 as an engine speed limit Ncmaxc. If the gear discriminated by the gearshift switch state discriminator 56e is the fourth gear, the third switching section 562n selects the second correction engine speed Ncmax2 that the second engine speed limit acquiring section 562m has loaded, and outputs the selected speed Ncmax2 as the engine speed limit Ncmaxc. The engine speed limit correcting section 562e calculates a correction engine speed limit Ncmaxa (=Ncmaxc+ΔNc) by adding to the engine speed limit Ncmaxc the correction engine speed ΔNc (=first correction engine speed ΔNa or second correction engine speed ΔNb) that is output from the second switching section 562k. If the maximum rated engine speed of the engine 10 is 2,000 rpm and the first engine speed limit Ncmax1 is 1,800 rpm, the second engine speed limit Ncmax2 is 1,600 rpm, for example.

The maximum value ΔNmax2 (e.g., 100 rpm) of the second correction engine speed ΔNb that is set in the second correction engine speed computing section 562j is preferably a value at which a value obtained by adding ΔNmax2 to the second engine speed limit Ncmax2 (e.g., 1,600 rpm) becomes smaller than the maximum rated engine speed Nmax of the engine 10 (e.g., 2,000 rpm).

Subsequent process steps by the engine speed limit computing section 562 are essentially the same as those shown in FIG. 12 for the first embodiment.

Process details by the engine control unit 57a of the engine controller 57 in the present embodiment are also essentially the same as those shown in FIG. 13 for the first embodiment.

In this way, the motor control element in the present embodiment is adapted to set the vehicle speed limit Scmax to a value falling within the vehicle speed range of the gear (third gear) next highest to the highest gear, and to ensure that irrespective of whether the gear selector element is selecting the highest gear or the next highest gear, when the actual vehicle speed reaches the previously set vehicle speed limit Scmax, the motor control element limits the minimum capacity of the second hydraulic motor 24 to the capacity limit (tilting amount limit) q2cmin. Additionally, during the selection of the third gear next highest to the highest gear by the gear selector element, when the actual vehicle speed approaches the vehicle speed limit, the engine control element limits the maximum engine speed to the first engine speed limit Ncmax1, and during the selection of the highest (fourth) gear by the gear selector element, limits the maximum engine speed of the engine 10 to the second engine speed limit Ncmax1 lower than the first engine speed limit.

In the thus-constructed present embodiment, when the gearshift switch 52 (see FIG. 4) is selecting the third gear, the correction engine speed limit Ncmaxa computed by the engine speed limit correcting section 562e is selected as the control engine speed limit Ncmaxb by the first switching section 562g of FIG. 17, the first correction engine speed ΔNa computed by the first correction engine speed computing section 562c is selected as the correction engine speed ΔNc by the second switching section 562k, and the first engine speed limit Ncmax1 loaded into the first engine speed limit acquiring section 562d is selected as the engine speed limit Ncmaxc by the third switching section 562n. Consequently, the correction engine speed limit Ncmaxa (=Ncmax1 (e.g., 1,800 rpm)+ΔNa (e.g., 0-200 rpm)) is computed by the engine speed limit correcting section 562e, and the computed correction engine speed limit Ncmaxa is input as the control engine speed limit Ncmaxb to the target engine speed determining section 572 of FIG. 13.

Thus, when the vehicle speed approaches the vehicle speed limit Scmax and the vehicle speed deviation ΔS becomes smaller than the limitation-starting vehicle speed deviation (e.g., 10 km/h), the correction engine speed limit Ncmaxa decreases from Ncmax1 (e.g., 1,800 rpm)+ΔNmax1 (e.g., 200 rpm) to Ncmax1 (e.g., 1,800 rpm). As in the selection of the fourth gear in the first embodiment, therefore, as the vehicle speed approaches the vehicle speed limit Scmax, the engine speed of the engine 10 progressively decreases from the maximum rated engine speed (e.g., 2,000 rpm) to the first engine speed limit Ncmax1 (e.g., 1,800 rpm), and when the vehicle speed reaches the vehicle speed limit Scmax, the maximum engine speed of the engine 10 is limited to the first engine speed limit Ncmax1 (e.g., 1,800 rpm).

In this way, when the minimum tilting amount of the second hydraulic motor 24 is limited to the tilting amount limit q2cmin, the maximum engine speed of the engine 10 is limited to the first engine speed limit Ncmax1 (e.g., 1,800 rpm), with the result that when the tilting amount limit q2cmin is set to be a value at which the vehicle speed limit Scmax can be obtained when the engine speed of the engine 10 is equal to the first engine speed limit Ncmax1 (e.g., 1,800 rpm), the maximum traveling speed of the wheel loader can be limited to the vehicle speed limit Scmax accurately and reliably.

In addition, even when the operator fully steps on the accelerator pedal 50, the maximum engine speed of the engine 10 is limited to the first engine speed limit Ncmax1 (e.g., 1,800 rpm) upon the arrival of the vehicle speed at the vehicle speed limit Scmax, so any loss of engine output horsepower at the limited maximum traveling speed can be suppressed and fuel efficiency improved.

Furthermore, during the start of traveling or in work mode, when the traveling speed is low and the actual vehicle speed is far off from the vehicle speed limit, since the maximum engine speed of the engine 10 is not limited by the engine speed limit, fully stepping on the accelerator pedal 50 raises the engine speed to the maximum rated engine speed and as in the first embodiment, maintains accelerating performance and working efficiency.

During the selection of the fourth gear by the gearshift switch 52, the correction engine speed limit Ncmaxa computed by the engine speed limit correcting section 562e is selected as the control engine speed limit Ncmaxb by the first switching section 562g of FIG. 17, the second correction engine speed ΔNb computed by the second correction engine speed computing section 562j is selected as the correction engine speed ΔNc by the second switching section 562k, and the second engine speed limit Ncmax2 loaded into the second engine speed limit acquiring section 562m is selected as the engine speed limit Ncmaxc by the third switching section 562n. Consequently, the correction engine speed limit Ncmaxa (=Ncmax2 (e.g., 1,600 rpm)+ΔNb (e.g., 0-100 rpm)) is computed by the engine speed limit correcting section 562e, and the computed correction engine speed limit Ncmaxa is input as the control engine speed limit Ncmaxb to the target engine speed determining section 572 of FIG. 13.

Thus, when the vehicle speed is low and this speed deviates from the vehicle speed limit Scmax by at least the limitation-increase-starting vehicle speed deviation (e.g., 10 km/h), the maximum engine speed is limited to the correction engine speed limit Ncmaxa of [Ncmax2 (e.g., 1,600 rpm)+ΔNmax2 (e.g., 100 rpm)]. In addition, when the vehicle speed approaches the vehicle speed limit Scmax and the vehicle speed deviation ΔS becomes smaller than the limitation-increase-starting vehicle speed deviation (e.g., 10 km/h), the correction engine speed limit Ncmaxa correspondingly decreases from [Ncmax2 (e.g., 1,600 rpm)+ΔNmax2 (e.g., 100 rpm)] to Ncmax2 (e.g., 1,600 rpm). As the vehicle speed approaches the vehicle speed limit Scmax, the engine speed of the engine 10 progressively decreases from the correction engine speed limit Ncmaxa (e.g., 1,700 rpm) that is equal to [Ncmax2 (e.g., 1,600 rpm)+ΔNmax2 (e.g., 100 rpm)], to the second engine speed limit Ncmax2 (e.g., 1,600 rpm), and when the vehicle speed reaches the vehicle speed limit Scmax, the maximum engine speed of the engine 10 is limited to the second engine speed limit Ncmax2 (e.g., 1,600 rpm).

In this way, when the minimum tilting amount of the second hydraulic motor 24 is limited to the tilting amount limit q2cmin, the maximum engine speed of the engine 10 is limited to the second engine speed limit Ncmax2 (e.g., 1,600 rpm), with the result that when the tilting amount limit q2cmin is set to be a value at which the vehicle speed limit Scmax can be obtained when the engine speed of the engine 10 is equal to the second engine speed limit Ncmax2 (e.g., 1,600 rpm), the maximum traveling speed of the wheel loader can be limited to the vehicle speed limit Scmax.

In addition, even when the operator fully steps on the accelerator pedal 50, before the vehicle speed approaches the vehicle speed limit Scmax, the maximum engine speed of the engine 10 is limited to the correction engine speed limit Ncmaxa of [Ncmax2 (e.g., 1,600 rpm)+ΔNmax2 (e.g., 100 rpm)]. Upon the arrival of the vehicle speed at the vehicle speed limit Scmax, the maximum engine speed of the engine 10 is limited to the second engine speed limit Ncmax2 (e.g., 1,600 rpm) lower than the first engine speed limit Ncmax1 (e.g., 1,800 rpm). In the fourth gear position, therefore, any loss of engine output horsepower at the limited maximum traveling speed can be suppressed even more significantly, and fuel efficiency improved even more greatly, than in the third gear position.

When the gearshift switch 52 is selecting the first gear or the second gear, the maximum rated engine speed Nmax (e.g., 2,000 rpm) that the maximum engine speed acquiring section 562f has read in is selected and this maximum rated engine speed is input as the control engine speed limit Ncmaxb to the target engine speed determining section 572 of FIG. 13.

Hence, during the start of traveling or during work mode, when the first gear or the second gear is selected, since the maximum engine speed of the engine 10 is not limited to the first engine speed limit Ncmax1 (e.g., 1,800 rpm) or the second engine speed limit Ncmax2 (e.g., 1,600 rpm), full activation of the accelerator pedal 50 increases the engine speed to the maximum rated engine speed and does not reduce working efficiency.

As described above, in the present embodiment, the selection of the first gear or the second gear yields the same advantageous effects as obtained when any one of the first to third gears is selected in the first embodiment, and the selection of the third gear or the fourth gear yields practically the same advantageous effects as obtained when the fourth gear is selected in the first embodiment. In addition, when the fourth gear is selected, since the maximum engine speed of the engine 10 is limited even before the vehicle speed approaches the vehicle speed limit Scmax, and since, upon the arrival of the vehicle speed at the vehicle speed limit Scmax, the maximum engine speed of the engine 10 is limited to a value smaller than that obtained in the third gear, any loss of engine output horsepower during the limited state of the maximum traveling speed can be suppressed even more significantly and fuel efficiency improved even more greatly.

A third embodiment of the present invention is described below using FIGS. 18 and 19. The present embodiment allows the vehicle speed limit in the first embodiment to be assigned from the outside of the controller, and the engine speed limit to be changed according to the assigned vehicle speed limit.

Figure 18:
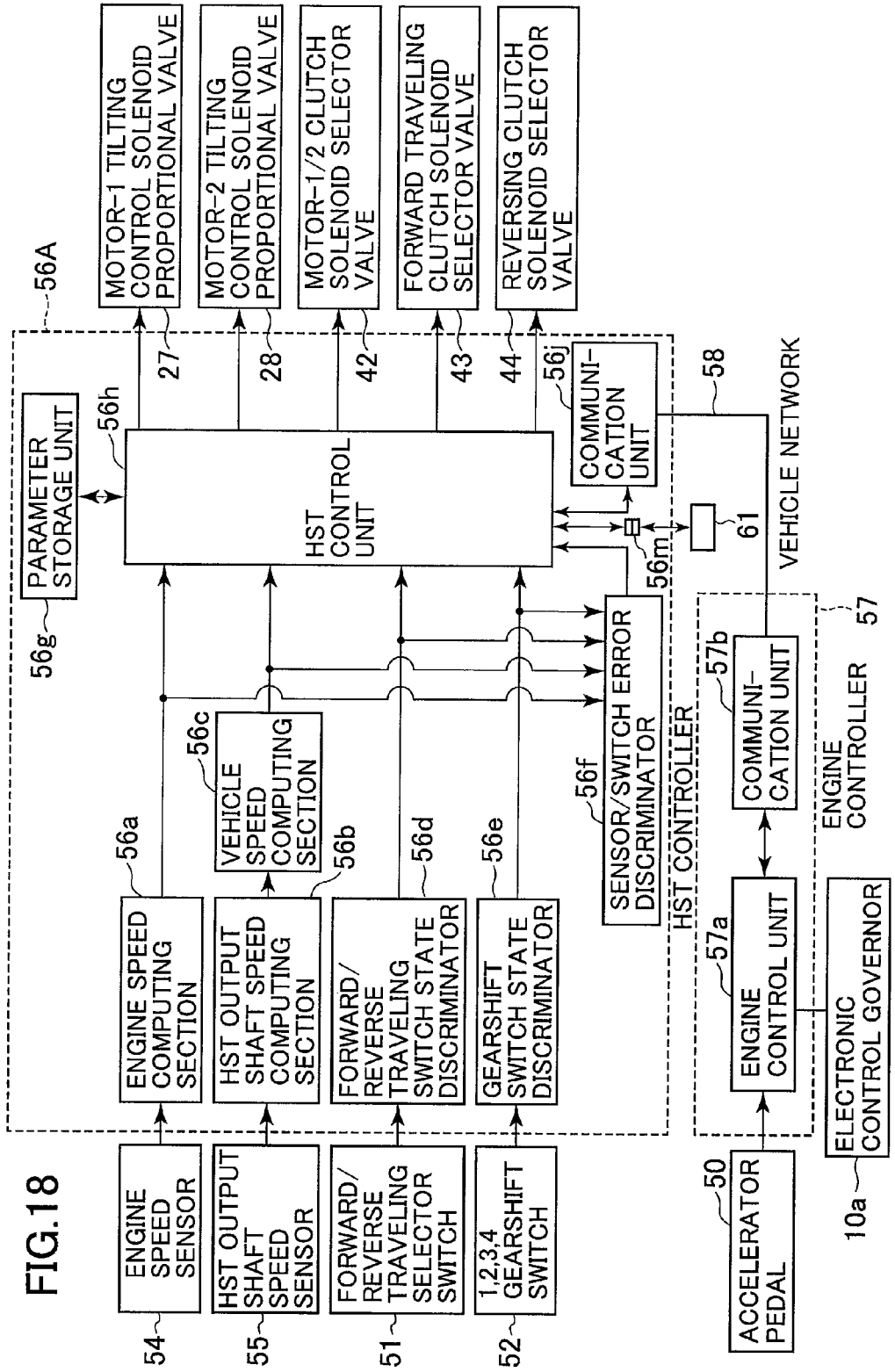
FIG. 18 is a diagram that shows functional details of the HST controller and engine controller in a third embodiment of the present invention, the diagram being substantially the same as that of FIG. 4.

FIG. 18 is a diagram that shows functional details of the HST controller and engine controller in the present embodiment, and this diagram is essentially the same as that of FIG. 4. In FIG. 18, sections equivalent to those shown in FIG. 4 are each assigned the same reference number.

The HST controller 56A in the present embodiment includes an input port 56m. An external setter 61 such as a simplified personal computer can be connected to the HST controller 56A by connecting the input port 56m to an input terminal of a cable connected to the external setter 61.

The external setter 61 allows the operator to enter any vehicle speed limit by operating an operating element such as a touch panel. The vehicle speed limit that has been entered from the external setter 61 is input to the HST control unit 56h via the input terminal 56m and stored into the parameter storage unit 56g.

Figure 19:
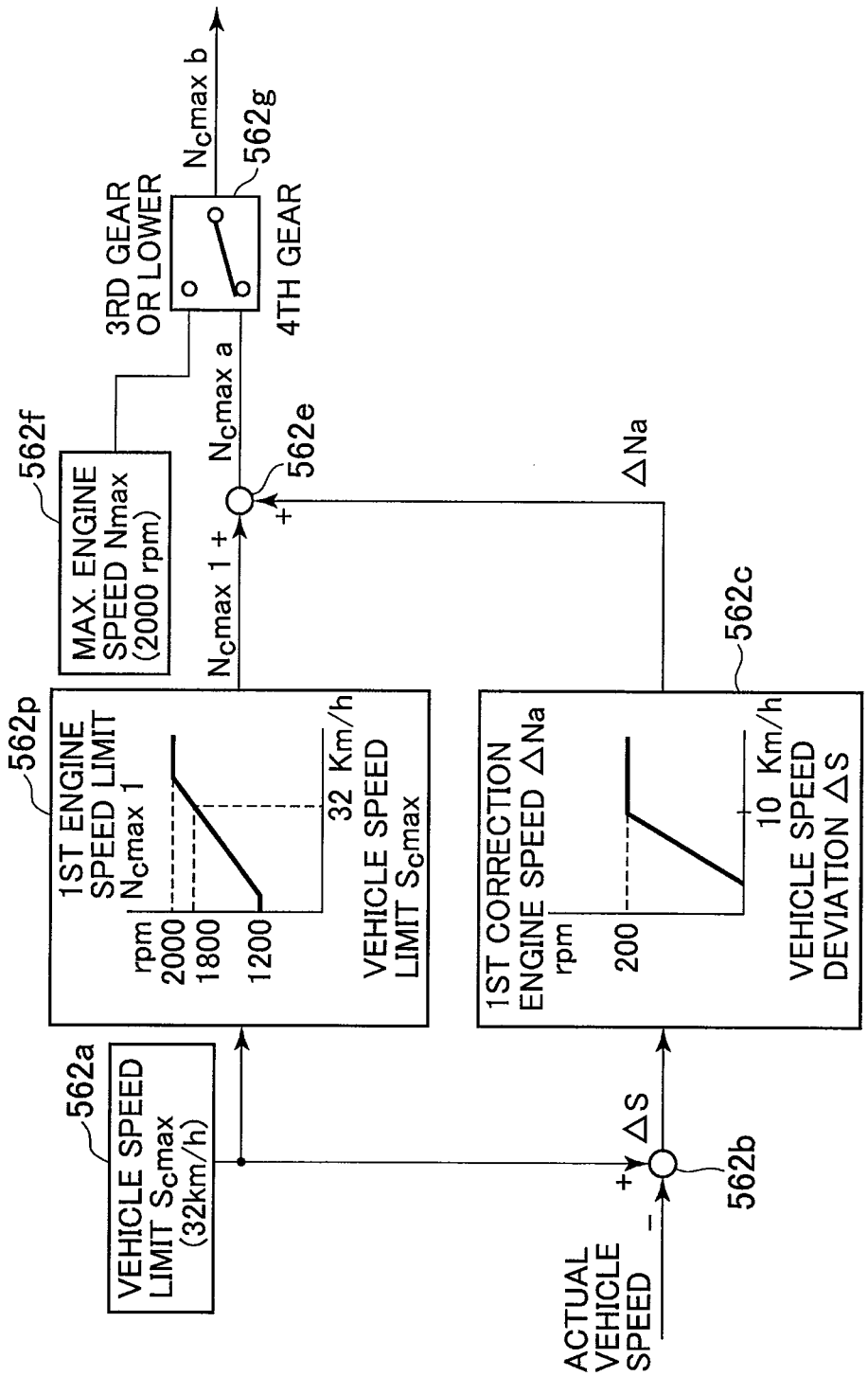
FIG. 19 is a diagram that shows details of processing in the engine speed limit computing section of the HST control unit in the third embodiment.

FIG. 19 is a diagram that shows details of the process in the engine speed limit computing section 562 (see FIG. 5) of the HST control unit 56h in the present embodiment. In FIG. 19, sections equivalent to those shown in FIG. 12 are each assigned the same reference number.

As with that shown in FIG. 12 of the first embodiment, the engine speed limit computing section 562 in the present embodiment includes a vehicle speed limit acquiring section 562a, a vehicle speed deviation computing section 562b, a first correction engine speed computing section 562c, an engine speed limit correcting section 562e, a maximum engine speed acquiring section 562f, and a first switching section 562g. The engine speed limit computing section 562 further includes a first engine speed limit computing section 562p instead of the first engine speed limit acquiring section 562d in the first embodiment.

The vehicle speed limit acquiring section 562a reads out the vehicle speed limit Scmax (e.g., 32 km/h) that as outlined above, has been entered from the external setter 61 and stored into the parameter storage unit 56g. The first engine speed limit computing section 562p views a memory-stored table and computes the first engine speed limit Ncmax1 corresponding to the vehicle speed limit Scmax that has been read out. In the memory table, a relationship between the vehicle speed limit Scmax and the first engine speed limit Ncmax1 is set to ensure that: for example, when the vehicle speed limit Scmax is equal to or less than a first required value (e.g., 20 km/h), the first engine speed limit Ncmax1 takes a first value (e.g., 1,200 rpm); when the vehicle speed limit Scmax exceeds the first required value (e.g., 20 km/h), the first engine speed limit Ncmax1 increases with increases in the vehicle speed limit Scmax; and when the vehicle speed limit Scmax reaches or exceeds a second required value (e.g., 40 km/h), the first engine speed limit Ncmax1 becomes the maximum rated engine speed (e.g., 2,000 rpm).

Other process details of the engine speed limit computing section 562 are essentially the same as those shown in FIG. 12 of the first embodiment.

Process details of the engine control unit 57a of the engine controller 57 in the present embodiment are also the same as those shown in FIG. 13 of the first embodiment.

The present embodiment provides the same advantageous effects as those of the first embodiment. In addition, even when the vehicle speed limit differs according to the particular site or country, the vehicle speed limit Scmax can be changed to the optimal value from the outside, and hence, the traveling system can be enhanced in versatility Furthermore, since the engine speed limit (first engine speed limit Ncmax1) changes according to the particular change in the vehicle speed limit Scmax, the optimal engine speed limit corresponding to the vehicle speed limit can be set.

A fourth embodiment of the present invention is described below using FIG. 20. The present embodiment allows the vehicle speed limit in the second embodiment to be assigned from the outside of the controller, and the engine speed limit to be changed according to the assigned vehicle speed limit.

In the present embodiment, as in the third embodiment, the HST controller 56A includes the input port 56m (see FIG. 18), to which the input terminal of the cable connected to the external setter 61 such as a simplified personal computer can be connected for entering any vehicle speed limit and storing the entered vehicle speed limit into the parameter storage unit 56g.

Figure 20:
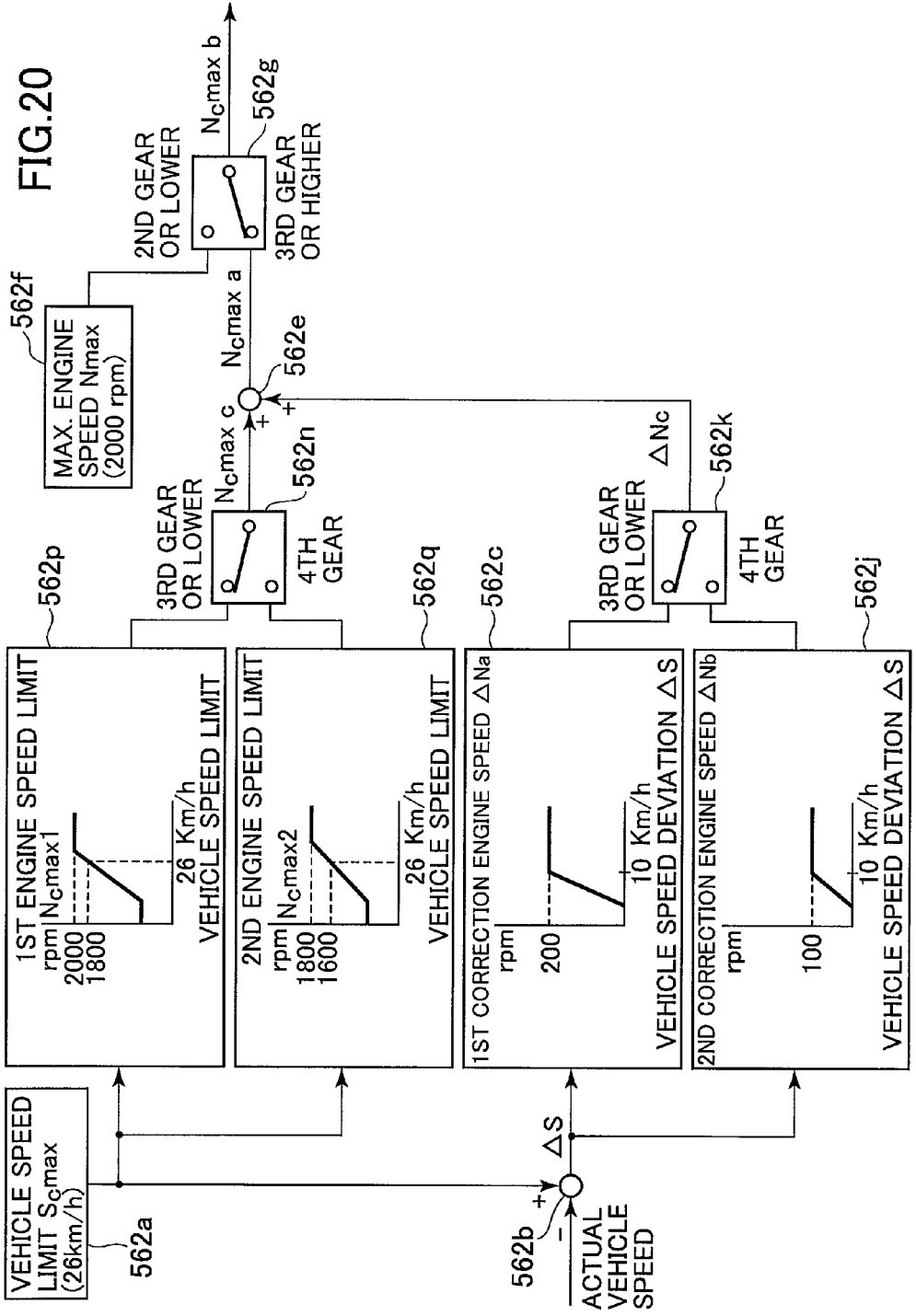
FIG. 20 is a diagram that shows details of processing in the engine speed limit computing section of the HST control unit in a fourth embodiment of the present invention.

FIG. 20 is a diagram that shows details of the process in the engine speed limit computing section 562 (see FIG. 5) of the HST control unit 56h in the present embodiment. In FIG. 20, sections equivalent to those shown in FIGS. 12 and 17 are each assigned the same reference number.

As with that shown in FIG. 17 of the third embodiment, the engine speed limit computing section 562 in the present embodiment includes a vehicle speed limit acquiring section 562a, a vehicle speed deviation computing section 562b, a first correction engine speed computing section 562c, an engine speed limit correcting section 562e, a maximum engine speed acquiring section 562f, a first switching section 562g, a second correction engine speed computing section 562j, a second switching section 562k, and a third switching section 562n. The engine speed limit computing section 562 further includes a first engine speed limit computing section 562p and a second engine speed limit computing section 562q, instead of the first engine speed limit acquiring section 562d and second engine speed limit acquiring section 562m in the first embodiment.

Process details of the first engine speed limit computing section 562p are essentially the same as those shown in FIG. 19 of the third embodiment.

The second engine speed limit computing section 562q makes reference to a memory-stored table and computes the second engine speed limit Ncmax2 corresponding to the vehicle speed limit Scmax (e.g., 26 km/h) that the vehicle speed limit acquiring section 562a has read out. In the memory table, a relationship between the vehicle speed limit Scmax and the second engine speed limit Ncmax2 is set to ensure that: for example, when the vehicle speed limit Scmax is equal to or less than a first required value (e.g., 20 km/h), the second engine speed limit Ncmax2 takes a first value (e.g., 1,200 rpm); when the vehicle speed limit Scmax exceeds the first required value (e.g., 20 km/h), the second engine speed limit Ncmax2 increases with increases in the vehicle speed limit Scmax; and when the vehicle speed limit Scmax reaches or exceeds a second required value (e.g., 40 km/h), the second engine speed limit Ncmax2 becomes a maximum rated engine speed of the engine 10 (e.g., 1,800 rpm).

Other process details of the engine speed limit computing section 562 are essentially the same as those shown in FIG. 12 of the first embodiment.

Process details of the engine control unit 57a of the engine controller 57 in the present embodiment are also the same as those shown in FIG. 13 of the first embodiment.

The present embodiment provides the same advantageous effects as those of the second embodiment. In addition, as in the third embodiment, even when the vehicle speed limit differs according to the particular site or country, the vehicle speed limit Scmax can be changed to the optimal value from the outside, and hence, the traveling system can be enhanced in versatility Furthermore, since the first and second engine speed limits each change according to the particular change in the vehicle speed limit Scmax, both the first and second engine speed limits can be set to equal the optimal value corresponding to the vehicle speed limit.

While several embodiments of the present invention have been described above, these embodiments can be modified in various forms within the spirit of the invention.

For instance, although the closed-circuit hydraulic drive system of the HST in each of the above embodiments has been described as including two hydraulic motors, namely the first hydraulic motor 23 and the second hydraulic motor 24, and using a motor control element to control the capacities of the two hydraulic motors in coordinative form, the number of hydraulic motors used may be one or even when the first and second hydraulic motors 23, 24 are used, the capacities of both may be controlled at the same time.

In addition, although the traveling system in each of the above embodiments has been described as including both a motor control element and an engine control element, the traveling system may include only the engine control element of the two control elements and perform a control function only of the engine control element (i.e., when the gear selector element is selecting the required gear that is either the highest gear or the next highest one, as the actual vehicle speed approaches the preset vehicle speed limit, the engine control element limits the maximum engine speed to the preset first engine speed limit lower than the maximum rated engine speed). More particularly, the travel device in each of the above embodiments has been described as including the HST, but if the travel device has a motive power transmission including a torque converter and a transmission, the traveling system may include only the engine control element of the two control elements so as to allow engine speed control according to the particular gear position and vehicle speed, thus allowing the limitation of the maximum traveling speed and the attainment of the invention's challenge (limiting the maximum traveling speed without decreases in engineering work efficiency of the machine or in the accelerating performance thereof during the start of traveling, and at the same time improving fuel efficiency by suppressing any loss of engine output horsepower at the limited maximum traveling speed).

The invention claimed is:

1. A traveling system for an engineering machine comprising:
an engine;
an accelerator pedal that indicates a basic target speed of the engine;
a travel device driven by the engine;
a multi-speed motive power transmission provided on the travel device;
gear selection means for selecting a gear of the motive power transmission;
a front work device provided at a vehicle front of the engineering machine for implementing work by using an output horsepower of the engine;
vehicle speed detection means; and
engine control means for limiting a maximum engine speed to a preset first engine speed limit (Ncmax1) lower than a maximum rated engine speed, while the gear selection means is selecting a required gear that is either the highest gear or the next highest gear, when an actual vehicle speed detected by the vehicle speed detection means approaches a preset vehicle speed limit (Scmax).

2. A traveling system for an engineering machine comprising:
an engine;
a travel device driven by the engine;
a multi-speed motive power transmission provided on the travel device;
gear selection means for selecting a gear of the motive power transmission, the motive power transmission being a Hydro-Static Power Transmission (HST) including a hydraulic pump driven by the engine and at least one hydraulic motor of a variable-displacement type connected in a closed circuit to the hydraulic pump;
vehicle speed detection means;
motor control means for controlling the capacity of the hydraulic motor according to an actual vehicle speed detected by the vehicle speed detection means, and limiting a minimum capacity of the hydraulic motor to a preset capacity limit (q2cmin) during selection of either the highest gear or the next highest gear as a required gear by the gear selection means when the actual vehicle speed reaches a preset vehicle speed limit (Scmax); and
engine control means for limiting a maximum engine speed to a preset first engine speed limit (Ncmax1) lower than a maximum rated engine speed, during the selection of either the highest gear or the next highest gear as the required gear by the gear selection means, when an actual vehicle speed detected by the vehicle speed detection means approaches a preset vehicle speed limit (Scmax).

3. The traveling system for the engineering machine according to claim 1, further comprising:
an electronic control governor that controls a fuel injection rate of the engine;
wherein the engine control means operates to compute a control target engine speed that is intended to decrease from the target engine speed to the first engine speed limit as the actual vehicle speed approaches the vehicle speed limit, and output the computed control target engine speed to the electronic control governor, when the accelerator pedal is indicating a target engine speed higher than the first engine speed limit.

4. The traveling system for the engineering machine according to claim 3,
wherein the engine control means includes:
first means for calculating a deviation between the actual vehicle speed and the vehicle speed limit, and computing a control engine speed limit that is intended to decrease from the maximum rated engine speed to the first engine speed limit as the vehicle speed deviation decreases, when the calculated vehicle speed deviation decreases below a required value and
second means for outputting the computed control engine speed limit as the control target engine speed when the target engine speed that the accelerator pedal indicates is higher than the computed control engine speed limit.

5. The traveling system for the engineering machine according to claim 2,
wherein the HST includes two hydraulic motors of the variable-displacement type connected as first and second hydraulic motors in a closed circuit to the hydraulic pump, the motors being connected in parallel to each other; and
the motor control means controls the capacities of the first and second hydraulic motors such that as the actual vehicle speed detected by the vehicle speed detection means increases, the capacity of the first hydraulic motor is reduced progressively and the second hydraulic motor is fixed at a maximum capacity, and such that when the capacity of the first hydraulic motor reaches a minimum capacity, the capacity of the second hydraulic motor is reduced progressively and the first hydraulic motor is fixed at the minimum capacity; the motor control means controls the capacity of the second hydraulic motor not so as to exceed the capacity limit (q2cmin), when the actual vehicle speed reaches the vehicle speed limit, during the gear selection means is selecting the required gear.

6. The traveling system for the engineering machine according to claim 2, further comprising:
an electronic control governor that controls a fuel injection rate of the engine;
wherein the engine control means operates to compute a control target engine speed that is intended to decrease from the target engine speed to the first engine speed limit as the actual vehicle speed approaches the vehicle speed limit, and output the computed control target engine speed to the electronic control governor, when the accelerator pedal is indicating a target engine speed higher than the first engine speed limit.

7. The traveling system for the engineering machine according to claim 6,
wherein the engine control means includes:
first means for calculating a deviation between the actual vehicle speed and the vehicle speed limit, and computing a control engine speed limit that is intended to decrease from the maximum rated engine speed to the first engine speed limit as the vehicle speed deviation decreases, when the calculated vehicle speed deviation decreases below a required value and
second means for outputting the computed control engine speed limit as the control target engine speed when the target engine speed that the accelerator pedal indicates is higher than the computed control engine speed limit.

* * * * *